(12) United States Patent
Kakekado et al.

(10) Patent No.: US 6,359,746 B1
(45) Date of Patent: Mar. 19, 2002

(54) MAGNETIC DISK DRIVE

(75) Inventors: Shigeru Kakekado, Tokyo; Tetsuo Inoue, Ichikawa, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/775,692

(22) Filed: Dec. 31, 1996

Related U.S. Application Data

(63) Continuation-in-part of application No. 08/527,579, filed on Sep. 13, 1995, now abandoned.

(30) Foreign Application Priority Data

| Sep. 14, 1994 | (JP) | 6-219953 |
| Jul. 11, 1995 | (JP) | 7-174805 |
| Mar. 10, 1996 | (JP) | 8-063260 |

(51) Int. Cl.⁷ .................................................. G11B 21/02
(52) U.S. Cl. ....................................... 360/75; 360/77.03
(58) Field of Search ............................ 360/75, 77.03, 360/78.4, 235.1

(56) References Cited

U.S. PATENT DOCUMENTS

| 4,777,544 A | * 10/1988 | Brown et al. ................... 360/75 |
| 4,814,907 A | * 3/1989 | Goor ............................ 360/75 |
| 4,931,887 A | * 6/1990 | Hegde et al. ................... 360/75 |
| 4,954,904 A | * 9/1990 | Goor ............................ 360/75 |
| 5,082,827 A | * 1/1992 | Barnes ...................... 360/75 X |
| 5,103,362 A | * 4/1992 | Belser et al. ......... 360/77.03 X |
| 5,153,785 A | * 10/1992 | Muranushi et al. ............. 360/75 |
| 5,168,413 A | * 12/1992 | Coker et al. ............... 360/75 X |
| 5,335,126 A | * 8/1994 | Tokyuama et al. ......... 360/75 X |
| 5,377,058 A | * 12/1994 | Good et al. .................... 360/75 |
| 5,488,519 A | * 1/1996 | Ishida et al. .............. 360/77.03 |
| 5,640,089 A | * 6/1997 | Horikawa et al. ........... 324/212 |
| 5,654,850 A | * 8/1997 | Gnapathi et al. ............ 360/103 |
| 5,764,430 A | * 6/1998 | Ottesen et al. ............ 360/75 X |
| 5,764,432 A | * 6/1998 | Kasahara ..................... 360/75 |
| 5,831,781 A | * 11/1998 | Okamura .................. 360/75 X |
| 6,005,736 A | * 12/1999 | Schreck ....................... 360/75 |

FOREIGN PATENT DOCUMENTS

| JP | 361113117 | * 5/1986 | ............... 360/75 C |
| JP | 361202384 | * 9/1986 | ............... 360/75 C |
| JP | 409097483 | * 4/1997 | ............... 360/75 C |

OTHER PUBLICATIONS

Van Nosrand's Scientific Encyclopedia, Douglas M. Considine, p. 1116–1121 and p. 1135, 1995.*

IBM Technical Disclosure Bulletin, C. Lin and D.J. Massaro, Electrostatically Loaded Slider Bearing, Dec. 1969, vol. 12, No. 7, p. 959.

* cited by examiner

Primary Examiner—David Hudspeth
Assistant Examiner—K. Wong
(74) Attorney, Agent, or Firm—Oblon, Spivak, McClelland, Maier & Neustadt, PC.

(57) ABSTRACT

A magnetic disk drive according to the invention is comprises a rotary magnetic disk, a magnetic head having a head slider arranged oppositely to the magnetic disk and a transducer supported by the head slider for performing recording/reproducing information to and from the magnetic disk, and voltage applying section for applying a voltage across the head slider and the magnetic disk in accordance with at least one of a track position on the magnetic disk in which the magnetic head is positioned and the operation mode of the magnetic disk drive.

13 Claims, 12 Drawing Sheets

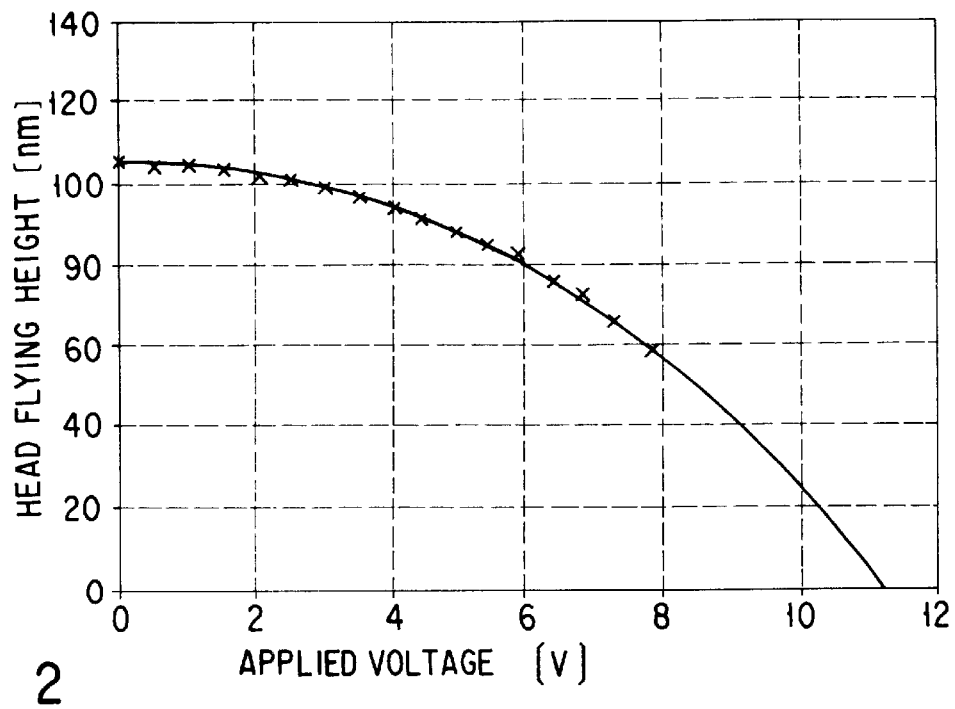
F I G. 2
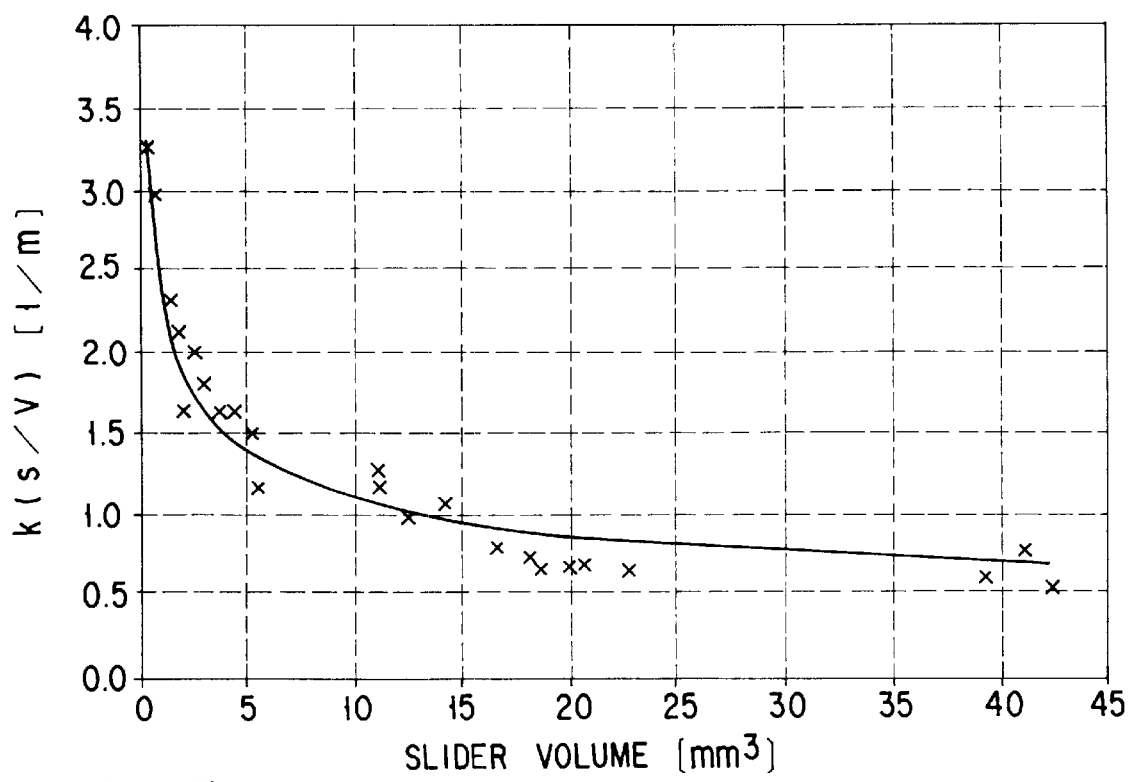
F I G. 3

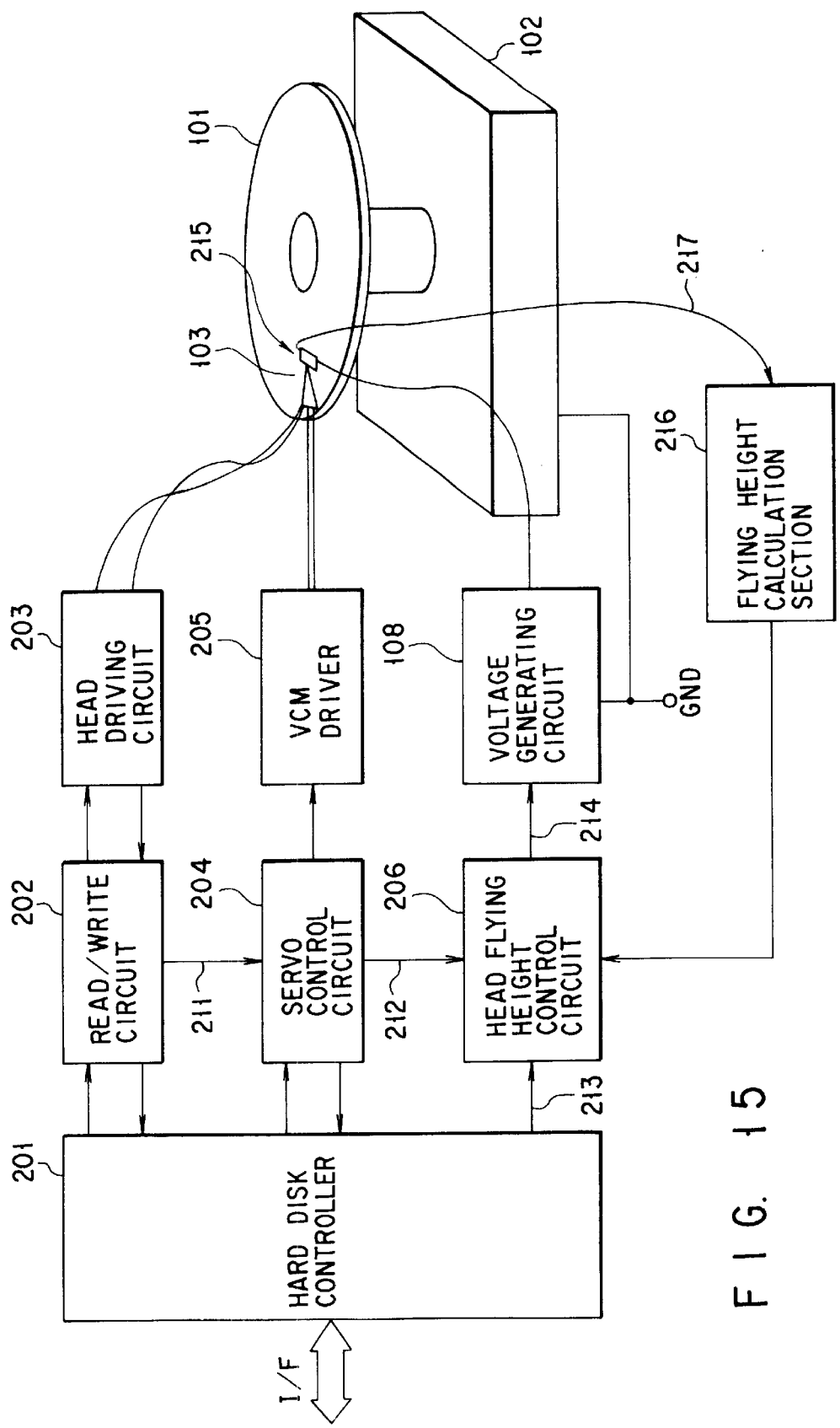
F I G. 15

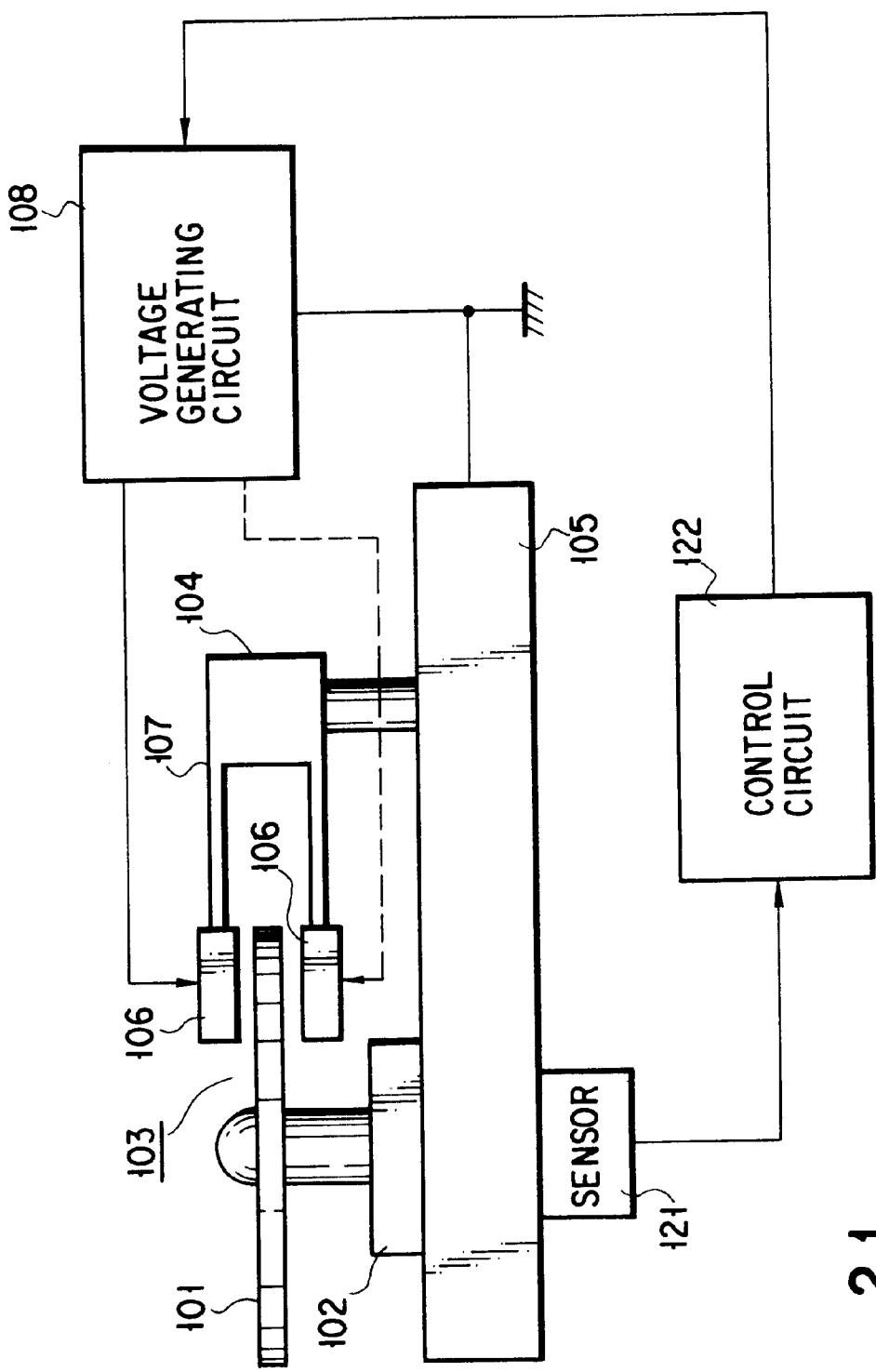
F I G. 21

MAGNETIC DISK DRIVE

CROSS-REFERENCE TO RELATED APPLICATIONS

This application is a continuation-in-part of U.S. patent application Ser. No. 08/527,579 filed Sep. 13, 1995, which is abandoned.

BACKGROUND OF THE INVENTION

The present invention relates to a magnetic disk drive.

A magnetic disk drive is used to record information in a plurality of concentric circular tracks and reproduce recorded information by rotating a magnetic recording medium of a disk type called a magnetic disk and by means of a magnetic head placed in an arbitrary radius position on the magnetic disk.

In such a magnetic disk drive, as a system of flying the magnetic head on the magnetic disk extremely slightly, e.g. 100 nm, by using the dynamic pressure effect of air, a fixed magnetic disk drive and a magneto-optical disk drive are available. In a drive like these, a given load is mechanically applied to a magnetic head in the direction of a magnetic disk by a suspension which supports the head, and this magnetic head is flied at flying height in which a force produced by a dynamic pressure bearing and the load given by the suspension are balanced.

The magnetic head moves to an arbitrary position on the magnetic disk. However, since the speed of an air flow passing through an air bearing increases more in an outer peripheral position than in an inner peripheral position, a flying force produced by a dynamic pressure air bearing increases and flying height also increases. There is a problem that reduction in a recording density is greater closer to the outer circumference as there is a negative correlation between this head flying height and the recording density. As methods of solving this problem and maintaining the recording density uniform in inner and outer circumferences, one to keep the flying height constant by providing an angle between the magnetic head and the air flow and one to attain the same purpose by adding some effective changes to the form of the bearing are known. However, by the former method variations in the flying height cannot be reduced so much though the air bearing section is simplified, and by the latter processing of the form of the air bearing section is difficult and besides the flying height cannot be made accurately constant.

In addition to the difficulty of making uniform the flying characteristic of a single magnetic head in every track position, it is difficult to make uniform the flying characteristics of a plurality of heads. That is, other than the air bearing section there are a great number of factors in which differences are generated, such as a suspension attaching position, a suspension load and the like, making it practically impossible to remove a difference in flying height among the heads. Thus, under the circumstances, some freedom is given to designing of a drive expecting such nonuniformity in characteristics.

As for cases where the head flying height variations due to a change with the lapse of time after the magnetic disk drive is assembled and the drive is set in an environment in which atmospheric pressure is extremely low, such as in highlands or the like, conventionally there have been no methods found to make the head flying height optimum.

The above-described magnetic disk drive in which the magnetic head is flied generally uses a method called CSS (contact/start/stop) of bringing the head into contact with the magnetic disk when the disk starts rotating and flying the head only when the number of rotations thereof increases. Since a load on the magnetic head is given by the suspension, almost the same load is applied at the time of contact as at the time of flying. As a result, there is a possibility that the magnetic disk may be destroyed by the load on the magnetic head at the time of performing the CSS. It is preferable for the load on the magnetic head to be big in order to improve stability against external disturbances, etc., at the time of flying. Generally, however, a light load of 3 to 10 grams is used so as to prevent destruction of the head.

Also, the dynamic pressure air-bearing mechanism has a sort of equivalent spring characteristic. In the case where acceleration is exerted from a source external to the drive due to a disturbance such as vibrations, therefore, the resulting shock fluctuates the flying height (i.e., the position) of the magnetic head slider. In recent years, the recording density has been increased with the increasing storage capacity of magnetic disk drives. A very low-flying structure has been developed with the flying height minimized. As a result, fluctuations of flying height due to disturbances causes an unstable write/read operation of the magnetic head for an increased error rate.

On the other hand, a method in which the magnetic head is not borne in air but kept in contact with the magnetic disk is available as a technique for increasing the recording density. A representative method is a floppy magnetic disk. A contact system has recently been employed, however, also for a fixed magnetic disk drive. In the contact system which has no fluctuations of flying height relatively stabilizes the position of the magnetic head. Nevertheless, air undesirably intrudes into a gap which is unavoidably formed between the magnetic head and the contact surface due to the fluctuations (surface roughness) of the surface of the magnetic disk.

With this reason, there are other methods by which the magnetic head is not flied but always brought into contact with the magnetic disk. Representative of them is a floppy disk and recently even for a fixed magnetic disk drive the use of this contact method has been proposed. Even in a case where the magnetic head is brought into contact with the magnetic disk, however, since air flows into spaces produced by ruggedness on a contact surface, contact surface pressure may be reduced when a sliding speed increases depending on the position of the magnetic head, the head touching may be deteriorated and S/N of a reproducing signal may be reduced. Thus, though a given pressing load is necessary for the magnetic head of a contact type, it is difficult to apply a sufficient load in order to prevent reduction in quality of the magnetic disk caused by sliding.

A load on the magnetic head is mechanically applied by a supporting spring such as a suspension and the like supporting the head. For this reason, if here are errors in manufacturing the magnetic head, the magnetic disk, etc., the load varies and this makes variations of flying height and pressure in contact surface, etc., to be big.

The contact system, like the air-bearing system, requires a certain degree of pressure load. It is necessary, however, to limit the load in order to avoid deterioration of the magnetic disk which otherwise might be caused by the sliding operation with the magnetic head. For this reason, the suspension (support spring member) for supporting the magnetic head and applying a minute load to it is very low in mechanical strength, resulting in a low resonance frequency due to the magnetic head and the suspension. Consequently, the magnetic head jumps up from the surface of the magnetic disk, especially when it is subjected to an external disturbance (a force such as a vibration having an acceleration) of a such a low frequency as to affect the mechanism of the magnetic disk and the magnetic head. The resulting increased distance between the magnetic head and the magnetic disk increases what is called the magnetic spacing, thereby making it difficult to produce a sufficient write/read signal characteristic. Also, due to the presence of fluctuations on the surface of the magnetic disk, the magnetic head is liable to jump up from the magnetic disk according as the resonance frequency due to the magnetic head and the suspension approaches the fluctuation frequency, thereby causing an unstable write/read signal characteristic.

In addition to the drive for mechanically obtaining the pressing force of the flying head, as disclosed in Japanese Patent Publication KOKAI No. 61-151839, there is available a drive for controlling flying height to be low by applying a voltage across the flying head and the disk in a device for eliminating a projection on the surface of the magnetic disk. According to this paper, the pressing force of the head increases by the application of a voltage. As to stable flying, however, no description is made in detail. A projection is supposed to be erased by a contact between the head and the disk. With the contact, however, electric charge is caused to flow across the head and the disk, making it impossible for the charge to be controlled.

Furthermore, in Japanese Patent Publication KOKAI No. 5-20824there disclosed is a drive for flying the head by giving electric charge to the magnetic head and the magnetic disk and utilizing an electrostatic repulsive force. In this case, a flying force by air is limited and thus pressure must be reduced inside the magnetic disk.

A method of measuring in real time and controlling the clearance between the magnetic head and the magnetic disk (hereinafter referred to simply as "the head clearance") is described in U.S. Pat. No. 5,153,785. This reference discloses a method of determining the head clearance in real time by measuring the field electron emission current generated by the field electron emission phenomenon between opposed metal electrodes. A method of controlling the head clearance is also disclosed, in which a fine vertical motion mechanism including a piezoelectric device is attached to an electrode 17. This control method requires a special mechanism of a piezoelectric device or the like. Further, this reference contains the description that the value of the head clearance is fed back to the control mechanism in such a manner as to control the clearance to a set value, but fails to disclose a specific solution.

BRIEF SUMMARY OF THE INVENTION

The object of the present invention is to provide a magnetic disk drive in which the flying height of the magnetic head (fluctuation of the contact state or flying height) can be appropriately controlled in accordance with the position of the magnetic head on a track or the operation mode of the magnetic disk drive.

More specifically, it is the object of the invention to provide a magnetic disk drive as specified in the following:
(1) Recording density uniform in both inner and outer circumferences of a magnetic disk is to be achieved by giving a head load for obtaining specified head flying height irrespective of the position of a magnetic head;
(2) Damages to the magnetic disk are to be reduced by reducing a head load at the time of CSS or idling in the case of a flying head, or at the time of sliding in the case of a contact head; and
(3) High density recording is to be realized with optimum head flying height by giving an appropriate load to the magnetic head irrespective of errors in manufacturing a suspension, etc.
(4). When the drive is subjected to a disturbance, a stabilized write/read signal characteristic is secured by suppressing the fluctuations of the flying height of the magnetic head of the air-bearing system or by controlling such fluctuations of the contact state of the contact system as to cause the magnetic head to come away from the magnetic disk.
(5) A stabilized write/read signal characteristic is secured by suppressing such fluctuations of the contact state as to cause the magnetic head to come away from the magnetic disk or the fluctuations of flying height due to the roughness of the surface of the magnetic disk.

In the first magnetic disk drive of the present invention is characterized by comprising: a rotary magnetic disk; a magnetic head having a head slider arranged oppositely to the magnetic disk and a transducer supported by the head slider for performing recording/reproducing information to and from the magnetic disk; and voltage applying section for applying a voltage across the head slider and the magnetic disk in accordance with at least one of a track position on the magnetic disk in which the magnetic head is positioned and the operation mode of the magnetic disk drive.

According to the present invention, by applying a voltage across a head slider and the magnetic disk, electric charges of reverse codes are generated on opposed surfaces of the head slider and the magnetic disk and an attracting force in proportion to the square of a potential difference is generated. The head slider is provided with a slider surface for forming an air bearing section so that it can fly on the magnetic disk and a flying force is generated against the magnetic disk by an air dynamic pressure effect produced by the rotation thereof. In short, by applying a voltage across the head slider and the magnetic disk to give an attracting force equal to a flying force, the magnetic head is flied up to specified height.

Also, according to the invention, by applying a voltage across the head slider and the magnetic disk in accordance with at least either of the track position of the magnetic head or the operation mode of the magnetic disk drive, head flying height is properly controlled based on the track position of the magnetic head or the operation mode of the magnetic disk drive.

The preferred manners of the magnetic disk drive of the invention are as follows:
(1) By the voltage applying section, a voltage applied across the head slider and the magnetic disk is increased as the track position of the magnetic head is moved from the inner peripheral side of the magnetic disk to the outer peripheral side, a head load is given so as to obtain specified head flying height irrespective of the position of the magnetic head and thereby recording density uniform both in the inner and outer circumferences of the magnetic disk can be achieved.
(2) By the voltage applying section, a voltage applied across the head slider and the magnetic disk is decreased to 0 or very small one at the time of a contact/start/stop mode, increased at the time of a seek mode higher than one at the time of the contact/start/ stop mode, increased at the time of a read/write mode higher than one at the time of the seek mode and thereby damages can be reduced by reducing a head load at the time of the CSS or idling in the case of the flying head or at the time of sliding in the case of the contact head.

Moreover, by giving an appropriate load to the magnetic head irrespective of errors in manufacturing the suspension, etc., high density recording can be realized with an optimum head flying height.

(3) By setting the upper limit of the level of a voltage applied across the head slider and the magnetic disk at $3\times(\omega R)^{1/2}$ (volt), the magnetic head can be surely flied on the magnetic disk, where, R is maximum track radius (m), $\omega$ is rotary angular velocity of the disk (1/s).

(4) By setting the volume of the head slider at one below 15 mm$^3$, a big electrostatic attracting force is generated to the mass of the head slider when a voltage is applied across the head slider and the magnetic disk and thereby a stable head flying characteristic can be obtained.

(5) If the flying height of the magnetic head on the magnetic disk in a recording/reproducing mode is set below 100 nm, the head flying height can be controlled by applying a small voltage across the head slider and the magnetic disk. p1 (6) By providing current limiting section for limiting a current caused to flow between the magnetic head and the magnetic disk when the head is brought into contact with the disk, the disk and the head can be prevented from being destroyed by an excessive current.

(7) An actuator electrically connected to the head slider for moving the head slider in the radial direction of the magnetic disk is further comprised, and the voltage applying section applies a voltage across the head slider and the magnetic disk via the actuator. Since a voltage is directly applied to an actuator, it is unnecessary to provide a special wiring for applying a voltage across the magnetic disk and the magnetic head.

(8) By detecting the flying height of the magnetic head on the magnetic disk and controlling a voltage applied across the head slider and the magnetic disk based on the result of this detection, a voltage to be applied can be properly controlled.

(9) The voltage applying section applies a voltage in accordance with the flying characteristic of each of a plurality of magnetic heads.

(10) The voltage applying section applies a voltage for controlling the flying characteristic of the magnetic head across the head slider of at least one selected from the plurality of magnetic heads and the magnetic disk.

(11) The head slider includes a composite head of which recording and reproducing elements are laminated, and a skew angle between the longitudinal direction of the magnetic gap and the track direction of the magnetic disk is almost constant from the innermost circumferential track to the outermost circumferential track.

(12) Since the drive is provided with section for limiting a current to flow between the magnetic disk and the magnetic head when the head is brought into contact with the disk, the magnetic disk and the magnetic head can be electrically and mechanically protected.

(13) Current limiting section is formed of an insulating layer provided on at least either of the opposed surfaces of the magnetic disk and the head slider or constituted of a resistor inserted between the magnetic head and the voltage applying section. In the latter case where the resistor is used as the current limiting section, it is preferable that resistance value thereof is bigger than a contact resistance value when the magnetic head is brought into contact with the magnetic disk.

(14) By providing an insulating layer on at least either of the opposed surfaces of the magnetic disk and the head slider, the magnetic disk and the magnetic head can be electrically and mechanically protected, and by keeping a voltage applied across the head slider and the magnetic disk below the dielectric breakdown voltage of the insulating layer, destruction of the insulating layer by the application of a voltage can be prevented.

(15) A head pressing force for pressing the magnetic head toward the magnetic disk is applied from the suspension which supports the magnetic head. By applying a small pressing force for pressing the magnetic head toward the magnetic disk from the suspension which supports the magnetic head, even when a voltage applied 6 across the head slider and the magnetic disk is decreased to 0 or very small one, a load weight on the magnetic head and flying height thereof can be stably maintained.

(16) As a reproducing head of the magnetic head, a magnetic flux sensing type such as an MR head and the like is used.

Since a voltage is directly applied to an actuator, it is unnecessary to provide a special wiring for applying a voltage across the magnetic disk and the magnetic head.

Also, according to the invention, there is a case where the magnetic disk is provided with a plurality of magnetic heads for recording/reproducing information to and from the magnetic disk having head sliders arranged oppositely to the magnetic disk and transducers supported by the head sliders; and voltage applying section for independently applying a specified voltage across the head slider and each of the plurality of magnetic disks.

In this case, if the voltage applying section is provided with a plurality of magnetic heads, by applying different voltages across the head slider and the magnetic disk in accordance with the flying characteristics of respective magnetic heads, nonuniformity in the flying characteristics of magnetic recording media can be corrected.

If the voltage applying section is provided with a plurality of magnetic heads, by applying a voltage for limiting the flying characteristics of selected optional magnetic heads across the head slider and the magnetic disk only therein and by maintaining bigger and safer flying height in the other magnetic heads, reliability of the drive can be improved.

Also, according to the first magnetic disk drive of the present invention, there is provided a magnetic disk drive, further comprising detection means for detecting such a disturbance as to fluctuate at least selected one of the position of the magnetic head slider and the driving force of the magnetic head with respect to the mechanisms for supporting the magnetic disk and the magnetic head slider, respectively, and control means for controlling the potential difference between the magnetic disk and the magnetic head slider applied by the voltage application means and setting the magnetic head slider in a predetermined position with respect to the magnetic disk on the basis of the detection result of the detection means.

As described above, according to the invention, it is possible to apply a load for giving specified head flying height irrespective of the track position of the magnetic head and to achieve uniform recording density both in the inner and outer circumferences. Moreover, it is possible to lengthen the life of the drive and further to reduce electric consumption by reducing a head load at the time of performing the CSS, sliding and idling and thereby reducing damages to the magnetic disk.

According to a second magnetic disk drive of the invention, there is provided a magnetic disk drive comprising a rotating magnetic disk constituting a recording medium, a magnetic head slider carrying a magnetic head for writing/reproducing the information on the magnetic disk, voltage application means for applying a potential difference between the magnetic disk and the magnetic head slider, detection means for detecting such a disturbance as to cause fluctuations of at least selected one of the position of the magnetic head slider and the driving force of the magnetic head with respect to the supporting mechanisms for supporting the magnetic disk and the magnetic head slider, respectively, and control means for controlling the potential difference between the magnetic disk and the magnetic head slider applied by the voltage application means and setting the magnetic head slider in a predetermined position with respect to the magnetic disk on the basis of the detection result of the detection means.

The magnetic disk drives according to preferred manners of the invention are described below.

(1) The magnetic head includes a magnetic head for recording/reproducing information while in contact with the surface of the magnetic disk, and the control means includes means for controlling the potential difference between the magnetic disk and the magnetic head slider applied by the voltage application means and stabilizing the state of the magnetic head slider in contact with the magnetic disk on the basis of the detection result of the detection means.

(2) The magnetic head includes a magnetic head for recording/reproducing information while flying above the magnetic disk with a predetermined spacing from the magnetic disk, and the control means includes means for controlling the potential difference between the magnetic disk and the magnetic head slider applied by the voltage application means and thus controlling the flying height of the magnetic head slider from the magnetic disk on the basis of the detection result of the detection means.

In the foregoing description, the position of the magnetic head slider and the driving force of the magnetic head represent the state of the magnetic head slider borne in air with a predetermined flying height for the air-bearing system, and the state of the magnetic head slider in contact with the surface of the magnetic disk by a predetermined contact force for the contact system.

(3) The detection means includes an acceleration detector.

(4) The control means operates in such a manner as to suppress the fluctuations of the position of the magnetic head slider and the fluctuations of the driving force of the magnetic head by controlling the potential difference applied by the voltage application means in accordance with the acceleration or the like of the disturbance detected by the detection means.

(5) Second detection means for detecting the roughness formed on the surface of the magnetic disk is further provided, and the control means controls the potential difference between the magnetic disk and the magnetic head slider applied by the voltage application means and thus controls at least selected one of the position of the magnetic head slider with respect to the magnetic disk and the driving force of the magnetic head in accordance with the roughness detected by the second detection means.

The magnetic head slider is made of an altic or the like conductive material. In the case where the magnetic head slider is made of a non-conductive material, a conductive film is formed on the slider surface opposed to the magnetic disk. This conductive film is formed with an insulating film of $SiO_2$ or diamond-like carbon (DLC). An insulating layer may alternatively be formed on the surface of the magnetic disk. Upon application of a potential difference between the magnetic film on the magnetic disk and the magnetic head slider (or the conductive film on the slider surface) by the voltage application means, charges of opposite polarities are generated on the opposed surfaces of the magnetic film and the magnetic head slider, thereby generating an attractive force proportional to the square of the potential difference.

The air-bearing force is exerted by the dynamic pressure air-bearing mechanism on the magnetic head slider of the magnetic disk drive or the like, so that the magnetic head slider is kept in position flying above the surface of the magnetic disk rotating at high speed. The magnetic head slider can also be kept flying at a predetermined height by an attractive force (electrostatic attraction) equivalent to the air-bearing force generated between the magnetic head slider and the magnetic disk due to the potential difference applied by the voltage application means.

The dynamic system acting on the magnetic head slider is described below. Assume that Fa is the force generated by the dynamic pressure air-bearing mechanism, Fe is an electrostatic attractive force, Fn is a predetermined load exerted on the slider from the suspension supporting the slider, Fd is an external disturbance applied to the magnetic head slider and Fc is the contact force between the magnetic head and the magnetic disk for the contact system. Fa is inversely proportional to the square of the distance between the surface of the magnetic disk and the magnetic head slider, and proportional to the affected surface area S of the slider and the relative speed (peripheral speed) U between the magnetic disk and the magnetic head slider. Fe is proportional to the square of the potential difference V applied by the voltage application means, inversely proportional to the square of the distance between the surface of the magnetic disk and the magnetic head slider and proportional to the affected surface area S of the slider. Fd is the product of the equivalent mass m of the magnetic head and the disturbance acceleration a.

These relations are given by equations (1) to (9) below.

$$Fa = \in aUS/H^2 \tag{1}$$

$$Fe = \in eV^2S/H^2 \tag{2}$$

$$Fn = \in f \tag{3}$$

$$Fd = m\alpha \tag{4}$$

$$Fa + Fc - Fe - Fn + Fd = 0 \tag{5}$$

Equation (5) is represents an equilibrium of forces, and equation (6) below is introduced from equations (1) to (4).

$$\in aUS/H^2 = \in eV^2S/H^2 + \in f \tag{6}$$

Solving this equation (6) about H, Fc and V, equations (7) to (9) are obtained.

$$H = [(\in aU - \in eV^2)S/\in f]^{1/2} \tag{7}$$

$$Fc = (\in eV^2 - \in aU)S/H^2 + \in f - m\alpha \tag{8}$$

$$V = \{(Fc - \in f + m\alpha)H^2/S + \in aU\}/\in e]^{1/2} \tag{9}$$

In these equations, $\in a$, $\in e$ and $\in f$ are proportionality constants.

Equation (7) indicates that a change in voltage V changes the flying height H, equation (8) that a change in voltage V changes the contact force Fc, and equation (9) that a constant contact force Fc or a constant flying height H can be maintained by controlling the voltage V against the disturbance acceleration α.

In the case where an inertial force is exerted due to a large disturbance acceleration or the like, the flying height or the contact force changes in accordance with equations (7) and (8), thereby causing an unstable reproduction signal. In view of this, a constantly stable signal reproduction is made possible by detecting the disturbance acceleration and applying a potential difference between the magnetic head and the magnetic disk by a feed-back circuit or by a feed-forward circuit in such a manner as to offset the inertial force in accordance with equation (9). The disturbance acceleration can be detected by detecting the acceleration directly, by detecting and differentiating the disturbance speed or by detecting and differentiating the displacement twice. In short, the quantity of state is detected and applied as a voltage to the magnetic head slider through a feed-back circuit or a feed-forward circuit thereby to reduce the inertial force due to the disturbance.

Also, a stable reproduction signal can be produced by detecting the quantities of state such as the displacement, speed, acceleration, etc., of the magnetic disk and by substituting an acceleration of inertia or calculating the fluctuation of flying height or the change in contact force directly, and then by applying a voltage to the magnetic head slider through the feed-back circuit or the feed-forward circuit in such a manner as to suppress the fluctuations of the flying height or the change in the contact force. Further, the load on the magnetic head due to the suspension or the like can be minimized by realizing a stabilized contact state of the contact system and a stabilized flying state of the air-bearing system. As a consequence, the service life of devices such as the magnetic head slider and the magnetic disk can be lengthened.

As described above, the magnetic disk drive according to the second magnetic disk drive of the invention can suppress the fluctuations of the position of the magnetic head due to the disturbances such as vibrations. In other words, the fluctuations of flying height of the magnetic head slider caused by disturbances can be suppressed for the air-bearing system, and the contact force fluctuations such as experienced when the magnetic head jumps up from the surface of the magnetic disk due to disturbances can be suppressed for the contact system. As a result, the instability of the write/read operations which otherwise might be caused by the disturbances can be prevented, with the result that a stabilized write/read signal characteristic can be secured against disturbances. Also, it is possible to suppress the fluctuations of the flying height or the fluctuations of contact force which are liable to occur due to the roughness of the surface of the magnetic disk. Consequently, the write/read signal characteristic can be prevented from becoming unstable due t6 the roughness of the magnetic disk surface, thereby making it possible to secure a stabilized write/read signal characteristic.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a view showing a relationship between head flying height and a voltage applied across a head slider and a magnetic disk;

FIG. 3 is a view showing a relationship between the volume of a head slider and a ratio of area/volume;

FIG. 15 is a view outlining a structure when head flying height is to be controlled by monitoring the height;

FIG. 21 is a block diagram showing the essential parts of a magnetic disk drive according to a fifth embodiment of the invention.

DETAILED DESCRIPTION OF THE INVENTION

Figure 1:
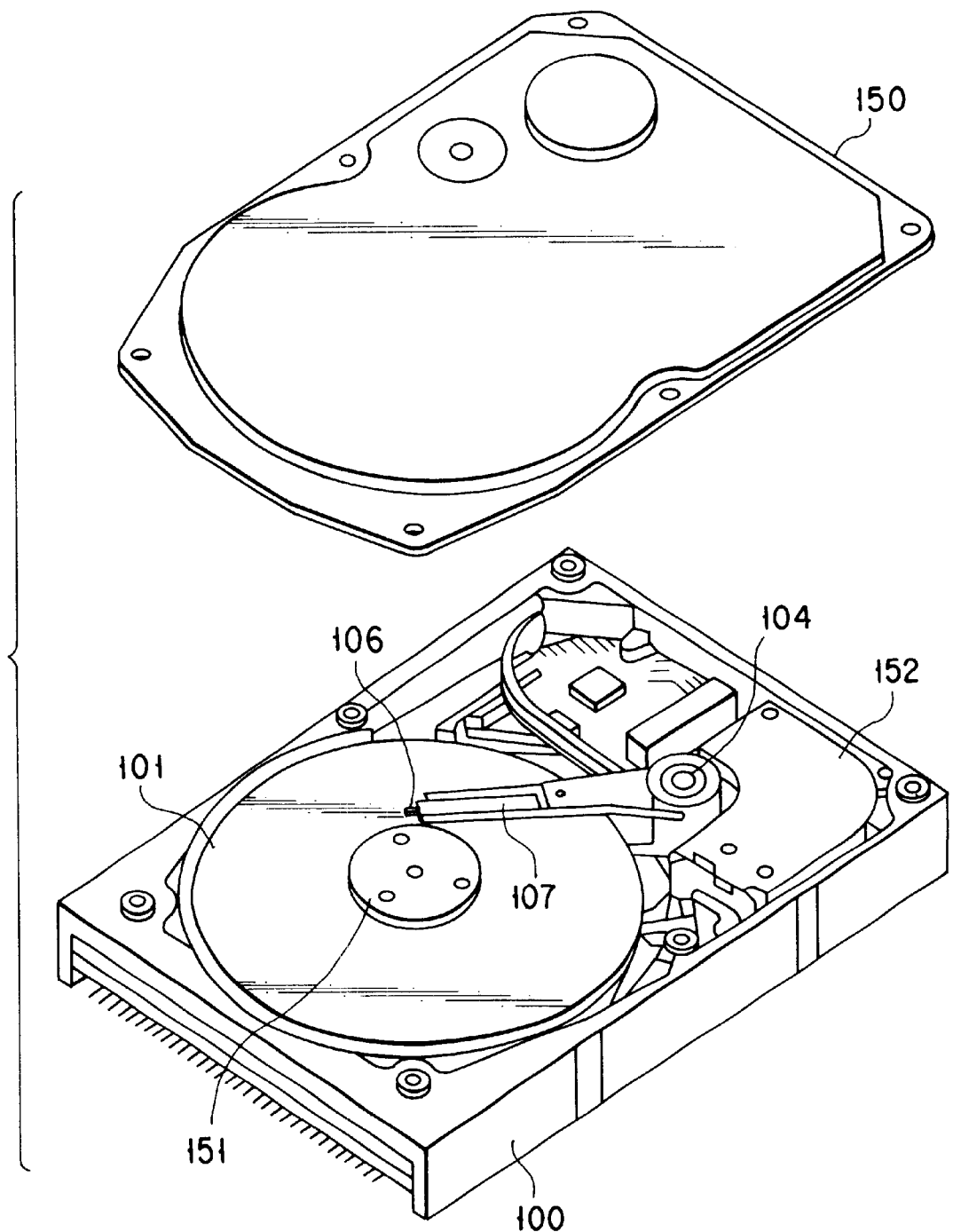
FIG. 1 is a view outlining the structure of a magnetic disk drive of the invention.

FIG. 1 is a view outlining the structure of a magnetic disk drive of the present invention.

As shown in this Figure, the case 100 of the magnetic disk drive is formed in the shape of a rectangular box with upper end thereof opened. The upper end opening of the case 100 is closed by a top cover 150 via a gasket. The top cover 150 is fixed on the case 100 by a plurality of screws.

In the case 100 one or a plurality of magnetic disks 101 and a disk driving mechanism (not shown in the drawing) for rotary-driving the magnetic disks 101 are set, the magnetic disks 101 are coaxially fitted into the hub of a spindle motor (not shown in the drawing) as a driving source of the disk driving mechanism and arranged along the axial direction of the hub. On the upper end of the hub an annular fixing ring 151 is fixed by a screw and the magnetic disks 101 are held between this fixing ring 151 and a flange (not shown in the drawing) set on the lower end of the hub.

The magnetic disks 101 comprise glass boards having center holes and magnetic layers formed on both surfaces of these glass boards.

The case 100 comprises a head section including a suspension 107 and a head slider 106, a mounting section for instructing this head section, a cylindrical head actuator 104 freely rotatably supported by the case 100 and a voice coil motor 152 for moving the head section to a predetermined position.

The preferred embodiments of the invention will be described with reference to the drawings.

Prior to explanation of the specific embodiments of the invention, the principle thereof will be described.

When a voltage is applied across the head slider (or an electrically conductive film on the head slider) and the magnetic disk according to the invention, electric charges of reverse codes are generated on the opposed surfaces of the head slider and the magnetic disk and an attractive force in proportion to the square of the applied voltage is generated. The head slider is provided with a slider surface for forming an air bearing section so as to fly on the magnetic disk, the magnetic disk is rotated and a flying force is generated in the head slider by dynamic pressure effect of air.

As a result, by applying a voltage for giving an attractive force equal to a flying force across the head slider and the magnetic disk, the magnetic head can be flied up to specified height.

The above-described a balance in forces for the head slider will be explained briefly again. It is assumed that the generating force of the air bearing is Fa, an electrostatic attractive force is Fe and a given load applied to the head slider by the suspension supporting the slider is Fn. Fa is inversely proportional to the square of a space between the surface of the magnetic disk and the head slider and proportional to a relative speed (circumferential speed) U among a head slider area S, the magnetic disk and the head slider. Here, U is a product of an angular velocity ω by the rotation of the magnetic disk and the disk radius R of a track in which the magnetic head is positioned (U=ωR). Fe is proportional to the square of an applied voltage V, inversely proportional to the square of a space between the surface of the magnetic disk and the head slider and proportional to the head slider area S. These relationships are represented by the following expressions:

$$Fa = \in a \times U \times S/H^2 \qquad (10)$$

$$Fe = \in e \times V^2 \times S/H^2 \qquad (11)$$

$$Fn = \in f \qquad (12)$$

Here, ∈a, ∈e and ∈f are proportional constants. A force balance equation is, Fa=Fe+Fn.

From the expressions (10) to (12), the following relationship is obtained:

$$\in a \times U \times S/H^2 = \in e \times V^{2 \times S/H^2} + \in f \qquad (13)$$

To change this expression in terms of H, the following can be obtained:

$$H = [(\in a \times U - \in e \times V^2) \times S/\in f]^{1/2} \qquad (14)$$

It can be understood from the expression (14) that the faster the circumferential speed U the higher the head flying height H; and the bigger the applied voltage V, the shorter the head flying height H. In a conventional magnetic disk drive which is equivalent to the case where the applied voltage is 0, the radius R changes when the magnetic head changes its position from the inner to the outer circumference and thus the head flying height H also changes.

According to the invention, by controlling the applied voltage V depending on a track position, the head flying height H is always maintained constant. If the applied voltage V is always constant, the head flying height changes depending on the circumferential speed and thus it is meaningless to apply a voltage.

As can be understood from the expression (10), a flying force generated by the magnetic head has a positive correlation with the rotational speed of the magnetic disk in a place in which the magnetic head is positioned. That is, if a comparison is made between the inner and the outer circumference, the flying height H of the magnetic head given a specified pressing force by the suspension is higher in the latter than in the former. Thus, recording density in the outer circumference is inevitably lower than that in the inner circumference. In recent years, there have been developed drives in which head flying height is set almost uniform both in the inner and outer circumferences in order to perform a number of recordings for increasing recording density in the outer peripheral section. As methods thereof, there are available one of forming an air bearing designed to obtain head flying height not according to the circumferential speed of the disk, one of limiting an increase in head flying height by making bigger the angle of the magnetic head to the magnetic disk closer to the outer circumference and causing air to obliquely flow to the magnetic head, etc. According to the invention, however, without implementing such special designs and by applying an appropriate voltage V determined by the circumferential speed of air and the posture of the magnetic head across the head slider and the magnetic disk, it is possible to keep head flying height H constant.

Even in a case where the magnetic head of a contact type is used, since air flows into spaces formed because of ruggedness on the surface of the magnetic disk, a flying force is generated when the circumferential speed of the magnetic disk increases and the pressing force of the head slider thereto is reduced. The magnetic head is caused by disturbing vibrations to float from the surface of the magnetic disk and thus it is necessary to preset the pressing force equal to or larger than (disturbing acceleration)×(the head mass) on the magnetic head. In the magnetic head of a contact type, reduction in pressing force thereof is greater closer to the outer circumference of the magnetic disk. However, it is possible to make the pressing force uniform by increasing a voltage applied across the head slider and the magnetic disk closer to the outer circumference.

Also, according to the invention, a voltage V applied across the head slider and the magnetic disk is controlled in accordance with the operation mode of the magnetic disk drive. That is, there is a possibility that if the rotational speed of the magnetic disk is reduced in order to conserve electric power at the time of an idling mode when reading/writing are not performed, the flying force of the magnetic disk is reduced thus lowering head flying height and head clashing may occur due to a contact between the magnetic head and the magnetic disk. Under these circumstances, by controlling a voltage applied across the head slider and the magnetic disk at the time of an idling mode, head flying height H is prevented from being lowered or the height is increased. Such an increase in the head flying height H at the time of idling is effective in that the possibility of head clashing is reduced when the height H increases.

The magnetic head stops on the magnetic disk before the disk starts rotating and the head starts to be flied by working of a flying force of the air bearing when the disk starts rotating. This is called a CSS (contact/start/stop) mode, in which the magnetic head slides on the magnetic disk at the initial period of rotation. This makes it necessary to cover and protect a magnetic layer on the magnetic disk. Still, there exists a danger that the layer may be destroyed if a head pressing force is too hard or if it takes a long time until the magnetic head is flied. Hence, in the CSS mode, by making small a voltage applied across the head slider and the magnetic disk or reducing this to 0, the pressing force of the magnetic head is made small against the magnetic disk and thereby the durability of the CSS is improved.

In a recent year, to prevent adsorption between the head and the disk, a method so called as a zone texture method which makes a surface of CSS portion coarse and improve a surface roughness of R/W data zone. In this method, difference in level between the CSS zone and the data zone may be generated and the conventional head has a defect which may clash during traveling of the head. According to the invention, a prevention of the adsorption of the head and high density recording can simultaneously be achieved by applying no voltage or lower voltage in the CSS zone, moving to the data zone in a state of which the head flying height is high and lowering the flying height by applying lager voltage than after moving of the head.

Furthermore, at the time of seeking for moving the magnetic head to a targeted track or not performing reading/writing even in an on-track condition, by reducing a voltage V applied across the head slider and the magnetic disk and increasing head flying height H, the danger of head clashing is averted.

At the time of reading/writing, by increasing a voltage V applied across the head slider and the magnetic disk and reducing head flying height and further by controlling the applied voltage V based on the track position as described previously, the head flying height is kept constant.

The pressing force of the magnetic head to be balanced with the flying force of the air bearing is not limited to one by means of the attractive force of electrostatic power. When the voltage applied across the head slider and the magnetic disk disappears due to failures, etc., in an electric circuit, it is difficult for the magnetic head to be stably flied because of the loss of the attractive force, generating the danger that head clashing may occur. For this reason, it is effective if a minimum load for preventing head clashing is given by the suspension and other mechanical methods. If a load is given on the magnetic head only by the suspension, attaching errors may bring about variations in excessive weights and head flying height. However, according to the invention, a load given by the suspension is small and thus variations in head flying height are made small.

Next, explanation will be made of the upper limit of a voltage V applied across the head slider and the magnetic disk.

For the expression (14) to be significant, a value inside [ ] must be equal to 0 or higher.

This condition is represented by the following:

$$(\in a \times U - \in e \times V^2) >= 0 \tag{15}$$

Hence, the upper limit of an applied voltage V is obtained by the following:

$$V \leq (\in a \times U / \in e)^{1/2} = \alpha \times U^{1/2} \tag{16}$$

In this expression (16), equality stands if head flying height H=0. Hence, α is obtained by the following expression from a relationship between an applied voltage Vm and a circumferential speed U when head flying height is 0:

$$\alpha = Vm/U^{1/2} \tag{17}$$

This means that α can be obtained only by the applied voltage Vm and the circumferential U not dependent on a head load or head flying height.

The upper limit of the applied voltage V shown in the expression (16) is a condition necessary for the head slider to be flied. If the voltage V exceeds this limit, the head slider cannot be flied and rather the slider falls down.

FIG. 2 shows the actual measurement of head flying height with respect to the applied voltage V.

This is a case where the volume of the head slider is 1.4 mm³ and a circumferential speed is 13.2 m/s. Points X are actual measured values and a solid line is externally inserted. The applied voltage is 11.2 V when head flying height is 0. Therefore, if $\alpha=11.2/(13.2)^{1/2}=3.08$ [V/(m/s)$^{1/2}$] and the circumferential speed is 13.2 m/s, the head flying height is 0 when the maximum applied voltage is 11.2 V and the magnetic head cannot be flied. The longer the radius of a track in which the magnetic head is positioned the faster the circumferential speed and thus this speed must be set in the maximum radius of the magnetic disk.

Consequently, the upper limit (Vmax) of the voltage V applied across the head slider and the magnetic disk is obtained by the following:

$$Vmax \approx 3 \times U^{1/2} = 3 \times (107\ R)^{1/2} [V]$$

A general purpose compact magnetic disk drive is not provided, different from a large type magnetic disk drive, with a power source in itself and operated by being supplied necessary power externally, mainly from a computer main body. Thus, as to power source and voltages necessary for magnetic disk drives, essential industrial standards are set depending on the sizes of disks. These values are only 5V for 1.8" HDD and 2.5" HDD, 5V and 12V for 3.5" HDD and 5.25" HDD and −5V, 5V and 24V for 8" HDD. When a voltage applied across the head slider and the magnetic disk exceeds these set values, a boosting circuit is needed, increasing power consumption, temperatures, an area for installing the circuit and manufacturing costs. These are all disadvantages to miniaturization of a drive. It is predetermined, therefore, that the upper limit of a voltage applied across the head slider and the magnetic disk is set at 24V equal to the maximum supplied voltage of a compact type magnetic disk drive.

More specifically, the maximum radiuses of magnetic disks 1.8", 2.5", 3.5", 5.25" and 8" used in a general purpose compact magnetic disk drive having high recording density are 24 mm, 32.5 mm, 47.5 mm, 65 mm and 105 mm respectively. The allowable maximum applied voltages, when the disks are rotated at the speed of 4200 rpm, 9.7V, 11.3V, 13.7V, 16.0V and 20.0V respectively.

Next, explanation will be made of the volume of a head slider.

It can be understood from the expressions (10) to (11) that a force acting on the head slider is proportional to a head slider area s. The flying posture and stability of the head slider are determined by a force externally worked on the unit mass thereof. Therefore, a ratio between the head slider area s and a head slider volume Vol is significant. If this ratio is k, the following relationship results:

$$k=s/\text{Vol} \qquad (18)$$

In the expression (18), a force acting on the unit mass of the head slider is made small when k is small, preventing the magnetic head from being stably flied. Conversely, a force acting on the unit mass thereof is made big when k is big, improving the flying stability of the magnetic head.

FIG. 3 shows relationships between the volumes of 36 kinds of existing head sliders often used in a hard disk drive and k. It is clear that k is 1 when the head slider volume is 15 mm$^3$, and when the volume Vol is reduced thereafter, k is steeply made bigger. Thus, by applying a voltage across the head slider whose volume Vol is below 15 mm$^3$ and the magnetic disk according to the operation mode of the magnetic disk drive and the track position of the magnetic head and pressing the magnetic head toward the direction of the magnetic disk, a big electrostatic attractive force can be given to the mass of the head slider and a stable flying characteristic can be obtained. It is predetermined, therefore, that the head slider volume Vol is set below 15 mm$^3$.

Figure 4:
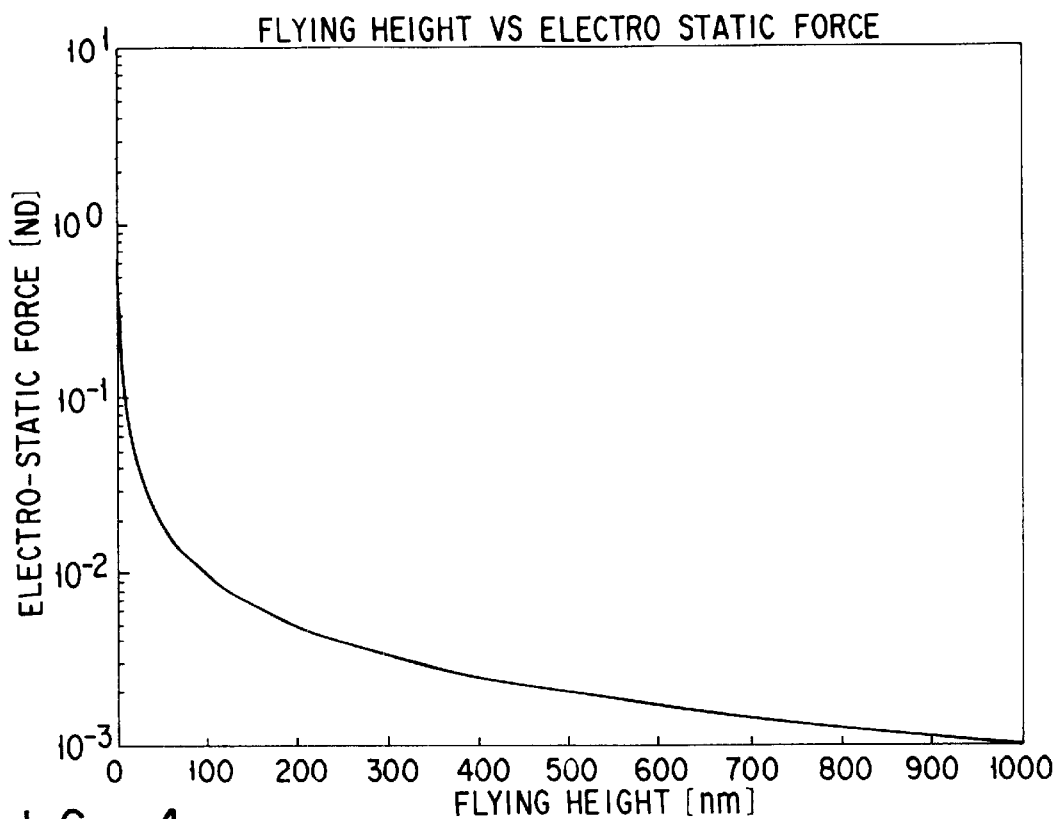
FIG. 4 is a view showing a relationship between an electrostatic attractive force and flying height.

Next, explanation will be made of head flying height H. It can be understood from the expression (11) that an attractive force is bigger when the head flying height H is shorter. That is, an electrostatic attractive force Fe is inversely proportional to H$^2$. FIG. 4 shows a relationship between the electrostatic attractive force Fe and the flying height H. It is clear that when the flying height is below 100 nm, the electrostatic attractive force is steely made bigger.

A flying force is made bigger when the head flying height H is shorter. However, since the flying force is generated by clashing of air molecules on a head slider surface, when the head flying height H falls below 100 nm, the number of clashing air molecules is made small and thus an increase in the flying force is smaller than that in the attractive force. Conversely, the electrostatic attractive force is strengthened inversely proportional to the square of a distance.

Therefore, in a case where the head flying height H falls below 100 nm, an electrostatic power head flying height control method is effective. This is the method of controlling the head flying height by applying a small voltage across the head slider and the magnetic disk in accordance with the operation mode of the magnetic disk drive and the track position of the magnetic head.

(First Preferred Embodiment)

Figure 5:
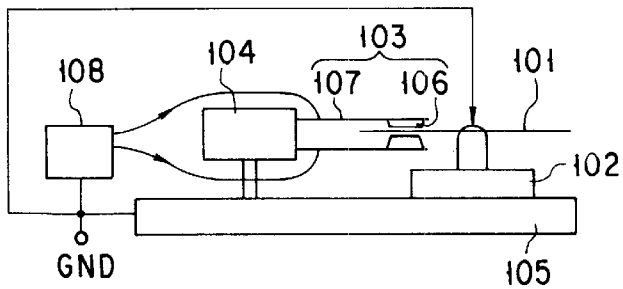
FIG. 5 is a view outlining a typical magnetic disk drive in the first embodiment of the invention.

FIG. 5 is a view outlining the structure of a magnetic disk drive in a first preferred embodiment. As shown in this drawing, the magnetic disk drive is provided with a spindle motor 102 for rotating a magnetic disk 101 and a head actuator 104 for moving a magnetic head 103 in the radial direction of the magnetic disk 101 and positioning it on an objection track on a frame 105.

The magnetic disk 101 is constructed by forming an electrically conductive magnetic layer on a base plate made of an aluminum alloy or glass and forming a protective layer made of SiO$_2$, diamond-like carbon (DLC) or the like thereon. The magnetic layer of the magnetic disk 101 is electrically connected to the rotary section of the spindle motor 102 by appropriate means and the rotary section of the spindle motor 102 is electrically connected to the frame 105 by means like a brush (not shown in the drawing). The frame 105 is electrically connected to a ground level GND.

The magnetic head 103 has a head slider 106 and a suspension 107, and a head slider 106 is made of an electrically conductive material like altic, etc. In a case where the head slider 106 is made of a nonconductive material, an electrically conductive film is formed at least on a slider surface in the slider section opposed to the magnetic disk 101. The head slider 106 is provided with a transducer for recording/reproducing (not shown in the drawing) on its tip and an air bearing section. As a transducer for recording, for instance an inductive head is used while as one for reproducing a head of a magnetic flux sensing type like an MR head is used. Or one inductive head may be used as a transducer for both recording and reproducing.

The suspension 107 made of a thin metallic plate supports the head slider 106. The head slider 106 and the suspension 107 are electrically insulated from frame 105. The suspension 107 mechanically gives the head slider 106 a pressing force about half the minimum value of one for generating specified flying height at the time of recording/reproducing (reading/writing) information in and from the magnetic disk 101.

A voltage generating circuit 108 is one for applying a positive or a negative DC voltage across the head slider 106 and the magnetic layer on the magnetic disk 101, the output terminal thereof is connected to the head slider 106 and the reference potential terminal thereof is connected to the frame 105. The voltage generating circuit 108 thus constructed generates a voltage having a given potential difference for the ground level GND electrically connected with the magnetic layer on the magnetic disk 101 and supplies electric charge to the head slider 106.

Furthermore, it may be possible that the head slider 106 is fixed on the suspension 107 by electrically conductive adhesive agents, etc., and electrically connected therewith, the magnetic head 103 is electrically insulated from the actuator 104 and the output terminal of the voltage generating circuit 108 is connected to the suspension 107.

The voltage generating circuit 108 reduces damages to the magnetic disk 101 and the magnetic head 103 by applying 0 or a very small voltage across the head slider 106 and the magnetic disk 101 at the time of CSS (contact/start/stop).

Figure 6:
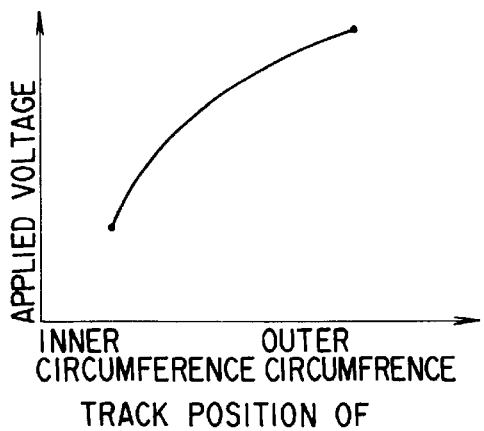
FIG. 6 is a view showing a relationship between a voltage applied across a head slider and a magnetic disk and the track position of a magnetic head.

At the time of reading/writing, as shown in FIG. 6, by reducing a voltage applied across the head slider 106 and the magnetic disk 101 when the magnetic head 103 is in the inner circumference of the magnetic disk 101 and increasing the voltage when the head is in the outer circumference thereof, the flying height of the head slider 106 is caused to be constant in any track position on the magnetic disk.

At the time of idling on standby for reading/writing, the rotational speed of the spindle motor 102 is reduced, a voltage applied across the head slider 106 and the magnetic disk 101 is made smaller than that at the time of reading/writing and thereby the flying height of the head slider 106 is prevented from falling. Since capacitance of the head slider 106 is relatively small, highly responsive voltage controlling can be performed when a voltage is applied across the head slider 106 and the magnetic disk 101.

Next, explanation will be made of a method of controlling a voltage applied across the head slider 106 and the magnetic disk 101 by the voltage generating circuit 108.

By monitoring the reproductive output of the magnetic head 103 in synchronizing signal one of servo areas on the magnetic disk 101 and, for instance, reducing an applied voltage when this reproductive output is too big and increasing the voltage when this is too small, head flying height is controlled. As a control signal which is a reference in the case of this controlling, it is predetermined that a reproductive output in a track position having the least number of causes for variations in head flying height (e.g. the innermost circumferential track position of the magnetic disk 101, a track position in which an angle between the magnetic head 103 and a recording track is 0) is used.

As methods of controlling an applied voltage V, the following may be adopted:

(1) Each time the magnetic head 103 is positioned in a track, a difference with the reference reproductive output is obtained and an applied voltage is controlled based on this difference; and (2) First reproductive outputs in all tracks are detected, a control signal of an applied voltage for every track is obtained based on a difference between these reproductive outputs and the reference output, this is stored in a memory as a table and then by reading a control signal corresponding to a track position from this table the applied voltage is controlled.

According to the first method, though controlling can be performed highly accurately, an arithmetic operation requires a long time. According to the second method, though an operation requires a short time, accuracy slightly drops. Like this, both have advantages and disadvantages and thus these may be selectively used depending on requirements.

If an MR head (a magnetic head of a magneto-resistive type) is used for a reproducing head of the magnetic head 103, since a reproductive output is not dependent on the circumferential speed of the magnetic disk 101 (a relative speed between the disk 101 and the head 103), head flying height can be controlled by controlling a voltage V applied across the head slider 106 and the magnetic disk 101 so as to make the solitary wave output of a reproductive output the same in all the tracks and thus a control system can be simplified.

(Second Preferred Embodiment)

Figure 7:
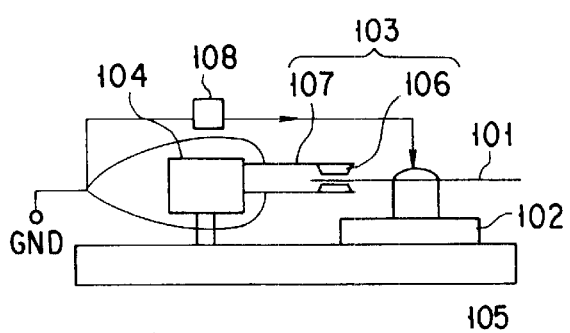
FIG. 7 is a view outlining a typical magnetic disk drive in the second embodiment of the invention.

FIG. 7 is a view outlining the structure of a magnetic disk drive in a second preferred embodiment. To explain points different from the first embodiment by giving the same symbols to sections corresponding to those in FIG. 5, in the second embodiment a head slider 106 is electrically connected to a ground level GND and the output terminal of a voltage generating circuit 108 is connected to a magnetic layer on a magnetic disk 101. Therefore, the magnetic layer on the magnetic disk 101 is insulated against the ground level GND.

In a magnetic head having an unstable structure of a transducer like an MR head, there is a danger of destroying the transducer if a voltage is applied thereto. In the second embodiment, however, there are no such dangers because the head slider 106 is connected to the ground level GND. Moreover, it is difficult for very little dust in charged air to be stuck to a magnetic head 103 and thus the flying operation of the head slider 106 never becomes unstable.

Next, explanation will be made of spacing between the magnetic disk 101 and the magnetic head 103 by referring to FIGS. 8 to 12.

Figure 8:
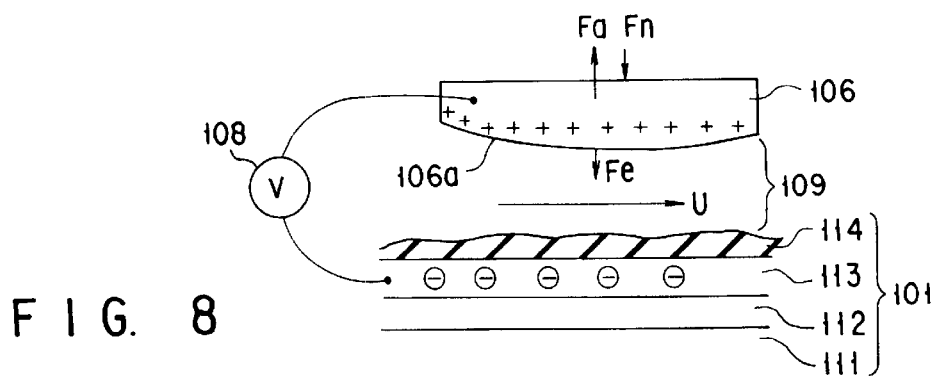
FIG. 8 is an expanded fragmentary sectional view showing a magnetic head and a magnetic disk drive at the time of recording and reproducing.

As shown in FIG. 8, the magnetic disk 101 is structured by laminating a buffer layer 112, a magnetic layer 113 and an insulating layer 114 made of a dielectric substance on an insulating base plate 111 like a glass plate. That is, the magnetic layer 113 is covered by the insulating layer 114 made of a ceramic thin film like $SiO_2$. A voltage V is applied across the magnetic layer 113 and the head slider 106 by the voltage generating circuit 108.

Between the head slider 106 and the magnetic disk 101 a given amount of spacing 109 is generated. When the magnetic disk 101 is rotated, air rotates at almost the same speed as the circumferential speed of the disk 101 and thereby a flying force Fa is generated. When a potential difference V is given across the magnetic layer 113 on the magnetic disk 101 and the head slider 106, positive/negative electric charge Q is generated and an electrostatic attractive force Fe is generated in the head slider 106. If a pressing force given to the head slider 106 by a suspension 107 is Fn, the magnetic head 103 is stably flied by the amount of spacing based on a relationship Fa=Fe+Fn. That is, as shown in FIG. 8, on a balanced point in which the sum of the electrostatic attractive force Fe and the pressing force Fn is equal to the flying force Fa, stable spacing 109 can be obtained.

Figure 9:
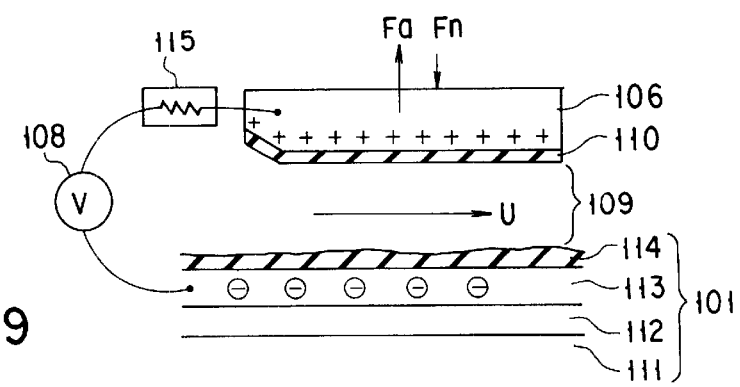
FIG. 9 is an expanded fragmentary sectional view showing a magnetic head and a magnetic disk in the second embodiment of the invention.

As shown in FIG. 9, it is possible to provide an insulating layer 110 on the surface of the head slider 106 besides providing the insulating layer 114 on that of the magnetic disk 101.

Figure 10:
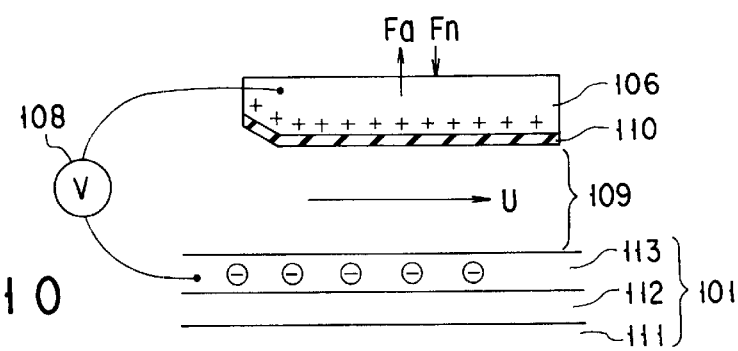
FIG. 10 is an expanded fragmentary sectional view showing a magnetic head and a magnetic disk in the second embodiment of the invention.

Furthermore, as shown in FIG. 10, it is possible to use a head slider covered by the insulating layer 110 for a magnetic disk 101 in which the magnetic layer 113 is not covered by the insulating layer 114.

The insulating layers 110 and 114 also function as mechanical and electrical protective layers. There is a possibility that the magnetic head 103 is brought into contact with the magnetic disk 101 when external vibrations and other disturbances come in. However, by the insulating layers 110 and 114 it is possible to prevent a direct contact between the magnetic head 103 and the magnetic layer 113 and mechanical destruction of the layer 113.

The thickness of the insulating layer 110 must be smaller than a distance between the magnetic layer 113 and the head slider 106. When the insulating layer 110 is too thin, however, insulation destruction is easily caused making it difficult to perform an original function as an insulating layer. Considering these, it is preferable to set the thickness of the insulating layer 110 within the range of 1 to 100 nm.

As shown in FIG. 9, a current limiter 115 (e.g. a resistor) may be provided between the voltage generating circuit 108 and the head slider 106. A similar current limiter may also be provided between the voltage generating circuit 108 and the magnetic layer 113 on the magnetic disk 101, or both therebetween. If such a current limiter is provided, it is possible to prevent the magnetic disk 101 and the magnetic head 103 from being destroyed by limiting a current flowing across the magnetic disk 101 and the magnetic head 103 when they are brought into contact with each other. The resistance value of a resistor used for the current limiter 115 must be larger than that of contact resistance at the time of a contact between the magnetic disk 101 and the magnetic head 103 and preferably several times as large or higher. As the current limiter 115, a current control circuit made of an active circuit can be used other than the resistor.

Furthermore, it is possible to make the insulating layers 110 and 114 shown in FIGS. 8 to 10 function also as current limiting means.

An attractive force is inversely proportional to the square of a space between the head slider 106 and the electrically conductive surface of the magnetic disk 101 and a flying force is inversely proportional to the square of a space between the surface of the magnetic disk 101 and the magnetic head. For this reason, a stable balanced point does not always exist between these forces and there is a possibility that the magnetic head 103 clashes with the magnetic disk 101 because the attractive force is too big or the magnetic head 103 is thrown off from the surface of the magnetic disk 101.

Figure 11:
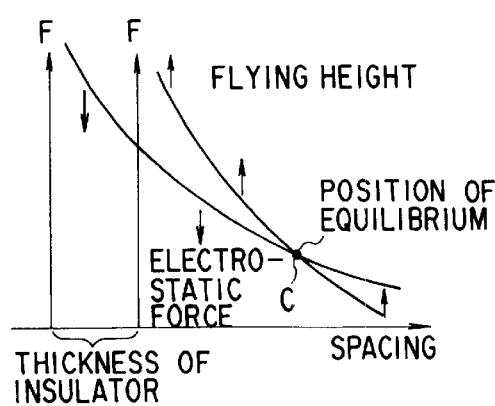
FIG. 11 is a view showing a relationship between the flying height of a magnetic head and an electrostatic attractive force.

As shown in FIGS. 8 and 9, the insulating layer 110 is formed on the surface of the magnetic disk 101, and as shown in FIG. 11 a space for the air bearing section can be reduced by the insulating layer 110. This solves the above-described problem. That is, since the space for the air bearing section is narrower than that between the head slider 106 and the electrically conductive surface of the magnetic disk 101 by thickness of the insulating layer 110, a balanced point C between the forces can be obtained and the magnetic head 103 can be flied with stable spacing.

If the insulating layers 110 and 114 are formed of dielectric substances, since an attractive force is made stronger by a dielectric constant, a necessary attractive force can be generated by a small applied voltage. Thus, this is preferable for a case where an applied voltage is to be limited.

In FIG. 11, an abscissa indicates the amounts of spacing (not including the thickness of the layer) while an ordinate indicates various forces worked across the head slider 106 and the magnetic layer on the magnetic disk 101.

Furthermore, as described above, if there are insulating layers 110 and 114, a current is not caused to flow even when the magnetic head 103 is brought into contact with the magnetic disk 101, making it possible to prevent destructions of the magnetic layer 113 and recorded contents. This point will be described further in detail hereinbelow.

Figure 12:
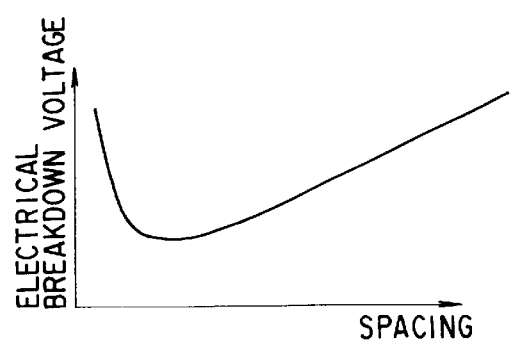
FIG. 12 is a view showing a relationship between spacing and dielectric breakdown voltage.

FIG. 12 is a characteristic diagram showing a qualitative correlation between an abscissa indicating the amounts of spacing (not including the thickness of the insulating layer) and an ordinate indicating dielectric breakdown voltages. As clear from this drawing, when there is an optimum amount of spacing in which the value of a dielectric breakdown voltage on an air layer is minimum, the dielectric breakdown voltage increases and irrespective of the size of a voltage larger or smaller than this optimum spacing amount.

The dielectric breakdown voltage on the air layer is, as known as Paschen's law, reduced when spacing is small in an large spacing area while a minimum value exists. In normal air pressure, since the insulation destroying voltage on the air layer is about 300V, there is no problem created by a voltage used for the magnetic disk drive. On the other hand, if there is a possibility of a direct contact between the magnetic head and the magnetic disk, problems may occur in the withstanding voltage of the insulating layers 110 and 114 not the air layer. For this reason, a voltage V applied across the head slider 106 and the magnetic disk 101 needs to be preferably limited to one below the dielectric breakdown voltages of the insulating layers 110 and 114.

If the insulating layers 110 and 114 are formed of dielectric substances, an attractive force is increased by a dielectric constant and thus a necessary attractive force can be generated by a small voltage. In this case, it may be possible to adjust a required applied voltage V by selecting a material having an appropriate dielectric constant and to limit the voltage to one below the withstanding voltage of the insulating layers 110 and 114.

A pressing force to be balanced with the flying force of the air bearing in the magnetic head 103 is not limited to one by the attractive force of an electrostatic one. When errors occur in the electric circuit and a voltage applied across the head slider 106 and the magnetic disk 101 is lost, the attractive force is also lost making it difficult to stably fly the magnetic head 101 and generating a danger of head clashing. An effective method to avert this situation is one of mechanically giving a minimum load on the suspension. If a load on the magnetic head 103 is given only by the suspension, influence of assembling errors bring about variations in load weights and flying height. However, according to the invention, a load given by the suspension is small and thereby variations in flying height are reduced.

When a voltage V applied across the head slider 106 and the magnetic disk 101 is controlled, by detecting the flying height of the magnetic head 103 more accurate controlling can be performed. It is possible to control the applied voltage V only by a track position on the magnetic disk 101 in which the magnetic head 103 is placed without detecting the head flying height. However, in this case, errors are generated due to individual differences among the magnetic heads 103. Detection of the head flying height is performed, for example, by utilizing a servo signal prewritten in the magnetic disk 101 so as to position the magnetic head 103 in a predetermined track, and the applied voltage is increased because the head flying height is high when the detected level of the servo signal is low and this is reduced because the head flying height is low when the detected level is high. In this way, by adsorbing the individual differences among the magnetic heads 103, uniform information signals can be reproduced from all the magnetic heads.

Detection of the head flying height can also be performed by monitoring the output of an AE (acoustic emission) sensor. There is tiny ruggedness on the surface of the magnetic disk 101, and even when the magnetic head 103 is flied considerably high, the head 103 sometimes clashes with a projected part on the surface of the magnetic disk 101. The AE sensor can count the number of impacts in this case. Therefore, by integrating an AE sensor output per unit time, the head flying height can be detected. Also, since capacitance between the magnetic head 103 and the magnetic disk 101 has a negative correlation with the head flying height, by detecting this capacitance the head flying height can be detected.

Furthermore, relating to cases where variations in the head flying height are generated due to the lapse of time after the magnetic disk drive is assembled and the magnetic disk drive is placed in an environment in which air pressure is low such as in highlands or the like, conventionally there have been no methods available of optimally controlling the head flying height. However, as described above, by detecting the head flying height and controlling the voltage applied across the head slider 106 and the magnetic disk 101, it is possible to deal with such variations in the head flying height, to improve lasting reliability of the magnetic disk drive and to expand environments for the use thereof.

For the form of the head slider constituting the air bearing section in the magnetic head 103, a general twin-body tapered flat type can be used. It is preferable, however, that the slider is not completely flat and rather given a very small crown. In the tapered flat type, though head flying height is higher on the upstream side than on the downstream side of an air flow, the amount of electric charge is constant in every section and thus an attractive force is bigger on the downstream side than on the upstream side making larger the inclination of the head slider. When this angle is too large, instability increases making it impossible to utilize a big attractive force.

Conversely, if a crown (a curved surface slightly expanding on a center projection part) is added to the surface 106a of the head slider 106 as shown in FIG. 8, spacing on the center of the head slider 106 is made small thereby increasing an electrostatic attractive force Fe thereon and reducing the inclination of the head slider 106 caused by an electrostatic force.

(Third Preferred Embodiment)

Figure 13:
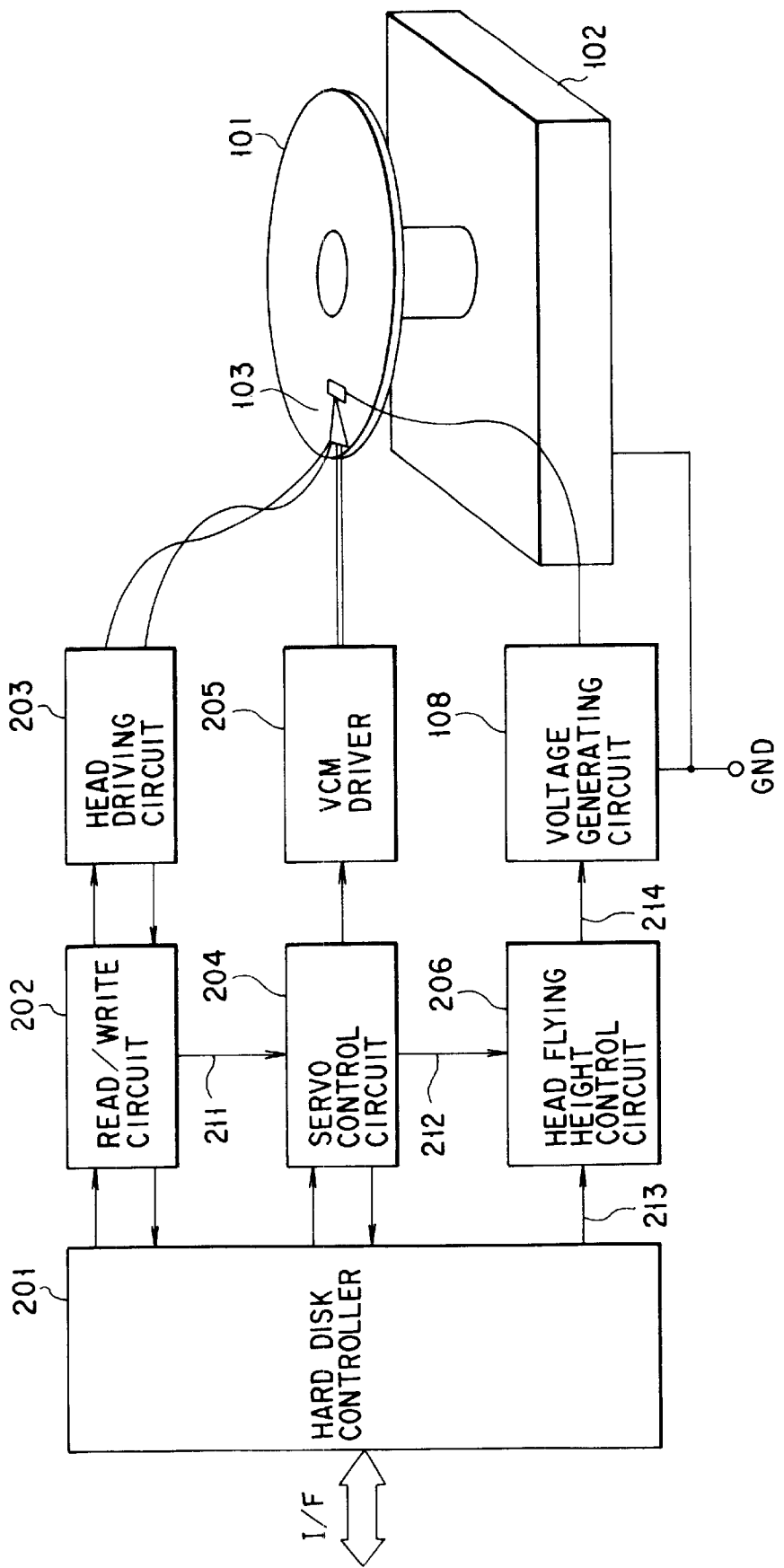
FIG. 13 is a view showing the structure of a magnetic disk drive in the third embodiment of the invention.

FIG. 13 is a block diagram showing further in detail the preferred embodiment of the magnetic disk drive (a hard disk drive) of the invention.

In this drawing, a hard disk controller (HDC) 201 performs exchanging of necessary control signals and data with the outside of the magnetic disk drive via an interface (IF).

A reading/writing (R/W) circuit 202 supplies data input via the HDC 201 to a magnetic head 103 via a head driving circuit 203 and writes the data in a magnetic disk 101 at the time of recording, and at the time of reproducing this circuit receives a signal read from the magnetic disk 101 by the magnetic head 103 via the head driving circuit 203 and gives this signal a specified processing and then transfers this to the HDC 201.

The reading/writing circuit 202 sends tracking servo data 211 generated based on servo information read from the magnetic disk 101 by the magnetic head 103 to a servo control circuit 204.

The servo control circuit 204 positions the magnetic head 103 in a targeted track on the magnetic disk 101 by controlling a VCM (a voice coil motor) driver 205 based on a targeted track number as a seeking command input from the tracking servo data 211 and the HDC 201 and moving and controlling the magnetic head 103 in the radial direction of the magnetic disk 101.

The servo control circuit 204 sends a track position signal 212 indicating the track position of the magnetic head 103, that is, in which track on the magnetic disk 101 the magnetic-head 103 is positioned, to a head flying height control circuit 206.

The head flying height control circuit 206 sends a voltage control signal 214 to a voltage generating circuit 108 based on this track position signal 212 and a mode signal (a signal indicating the operation mode of the magnetic disk drive) input from the HDC 201.

The voltage generating circuit 108 applies a voltage controlled based on the voltage control signal 214 across the head slider of the magnetic head 103 and the magnetic disk 101.

In this way, the flying height of the magnetic head 103 is controlled.

Figure 14:
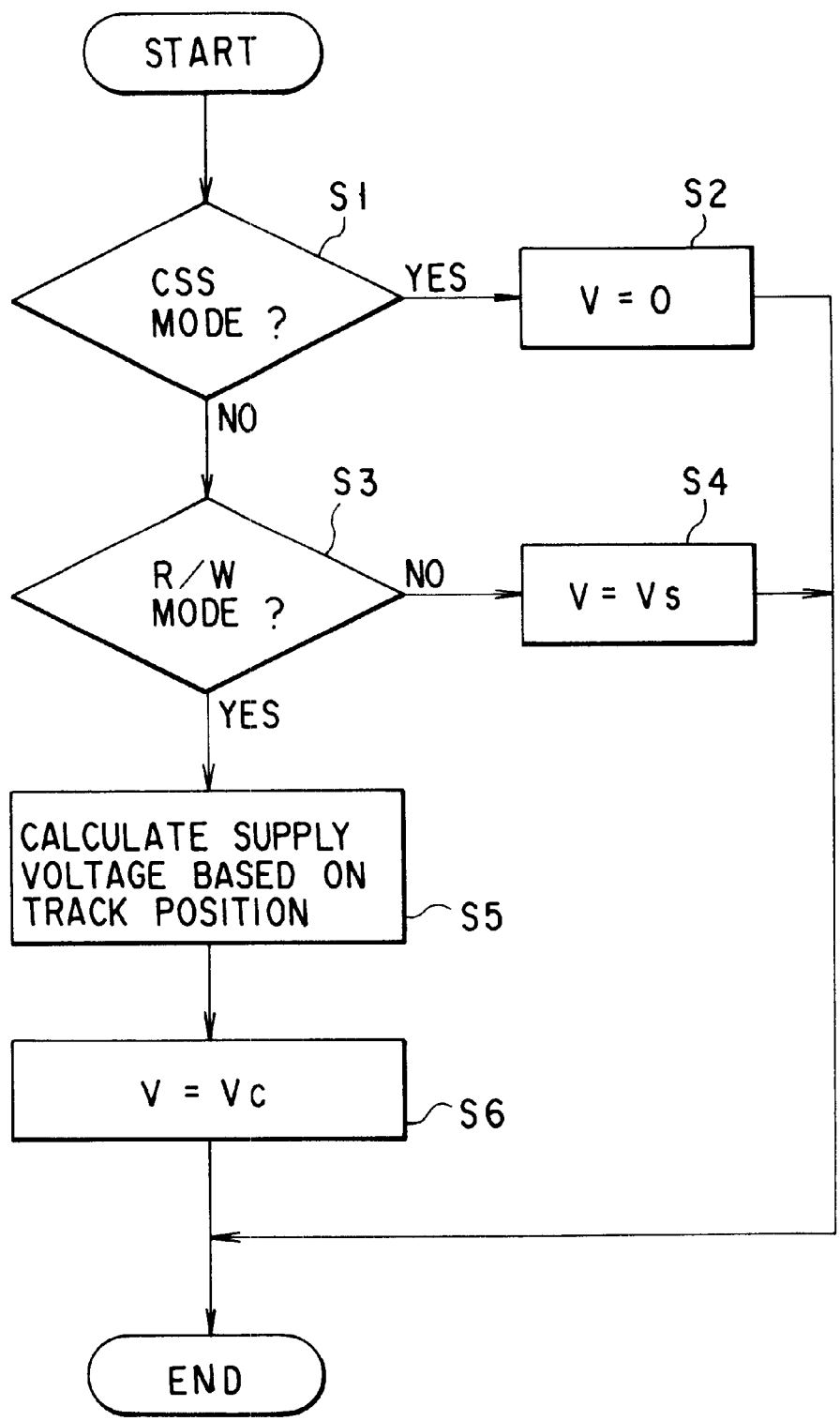
FIG. 14 is a flow chart illustrating an operation in the third embodiment.

The operation of the head flying height control circuit 206 in the third embodiment will be described by referring to a flow chart in FIG. 14.

The head flying height control circuit 206 first identifies the operation mode of the magnetic disk drive by means of the mode signal input from the HDC 201 and then based on this identification supplies a voltage control signal 214 to the voltage control circuit 108.

As described above, in the magnetic disk drive, in particular in the hard disk drive, the CSS (contact/start/stop) is generally performed at the time of starting. That is, at the time of starting the drive, the magnetic head 103 is brought into contact with the magnetic disk 101 before the magnetic disk 101 starts rotating, and after the disk 101 starts rotating, the magnetic head 103 is flied therefrom by the flying force of the air bearing. On the other hand, when the drive is stopped, the magnetic head 103 is changed from a flying state to a contact state with the magnetic disk 101. When the magnetic disk drive is in a CSS mode, for the object of reducing a frictional force which causes damages to the magnetic disk 101 and the magnetic head 103 and shortening the operation time of the CSS, it is preferable to make the pressing force of the magnetic head 103 to the magnetic disk 101 as small as possible.

The head flying height control circuit 206 first identifies whether the operation mode of the magnetic disk drive is in a CSS mode or nor from a mode signal 213 (step S1), and if this is in the CSS mode supplies a voltage control signal 214 for reducing a voltage V applied across the magnetic disk 101 and the head slider 106 of the magnetic head 103 to 0 (or very small one) to the voltage generating circuit 108 (step S2). If the applied voltage V is 0 (or very small one), an electrostatic attractive force between the magnetic disk 101 and the head slider 106 is very small and thus the pressing force of the magnetic head 103 to the magnetic disk 101 can be limited to small one.

Next, the head flying height control circuit 206 identifies whether the operation mode of the magnetic disk drive is in a reading/writing (R/W) mode or not from a mode signal 213 (step S3). The magnetic disk drive performs a seeking operation before turning to the R/W mode after the CSS. Thus, not reaching the R/W mode means that the drive is still in the seek mode. When the drive is identified not to be in the R/W mode in the step S3, that is, in the seek mode, a voltage control signal 214 for causing the applied voltage V to V=Vs is supplied to the voltage generating circuit 108 (step S4).

Next, after it is confirmed that the magnetic head 103 reaches a targeted track on the magnetic disk 101 and is in an on-track condition, the drive is switched to the R/W mode. After confirming switching of the drive to the R/W mode, the head flying height control circuit 206 supplies a voltage control signal 214 for causing the applied voltage V to a specified voltage V=Vc according to a track position indicated by a track position signal 212 input from the servo control circuit 204 to the voltage generating circuit 108.

A relationship between the applied voltage V=Vs when the operation mode of the magnetic disk drive is in the seek mode and the applied voltage V=Vc when this is in the R/W mode is set in the following way.

In the seek mode, different from the case of the R/W mode where the magnetic head 103 is kept in the set position of an optional track on the magnetic disk 101 and reading/writing of a signal is performed, by moving the magnetic head 103 in the radial direction of the magnetic disk 101 head flying height is dynamically fluctuated and, expecting some room thus generated, the value of the head flying height is set slightly higher than that in the case of R/W mode. Therefore, head flying height in the applied voltage V=Vs in the seek mode, is slightly higher than in the applied voltage V=Vc in the R/W mode, and usually the head mode is set at a value so that head flying height can be read by a signal recorded in a servo area with lower recording density than one recorded in a data area on the magnetic disk 101 by a required S/N.

By setting an applied voltage in the seek mode lower than one of in R/W mode, difference in level between the zones in a zone texture disk can be moved without clash.

On the other hand, in the R/W mode, since there are no dynamic variations generated in head flying height different from the case in the seek mode, by setting the applied voltage V=Vc according to a track position in which the magnetic head 103 is placed, head flying height is set uniformly in all the track positions in which reading/writing is to be performed.

As described above, in the third embodiment, by controlling a voltage V applied across the magnetic disk 101 and the head slider 106 in accordance with the operation mode of the magnetic disk drive and a track position, head flying height can be properly controlled.

The head flying height control circuit 206 may calculate the applied voltage V=Vc in the R/W mode from a track position by means of a specified approximate expression or may obtain the applied voltage in accordance with a track position, that is, a zone to which a targeted track belongs, by dividing the data area on the magnetic disk 101 into several zones and referring to a memory table indicating relationships between the zones premade by calculation and the applied voltage.

In the third embodiment described above, the applied voltage V is controlled in accordance with both the operation mode and the track position. However, when there are not much fluctuation in head flying height depending on the track position like in a case where a negative pressure slider is used for the head slider, the applied voltage V may be controlled only by the operation mode. In this case, the applied voltage V may be relatively small. It is also possible to change the applied voltage V so as to correct variance in head flying height caused by individual differences among the magnetic heads 103.

In the above description of the third embodiment, reference was made to a case where, without monitoring the head flying height, the applied voltage V is controlled by means of open-loop control. However, it is possible, as described previously, to control the applied voltage V by means of feedback control by monitoring the head flying height. In this case, a reproducing signal is fetched from the magnetic head 103 into the head flying control circuit 206 via the reading/writing circuit 202 and the applied voltage V is controlled so as to keep the level of the reproducing signal constant.

Furthermore, the above description of the third embodiment was made based on a case where a servo signal is recorded by the same frequency from the inner to the outer circumference of the magnetic disk 101. There is another case, however, depending on the structure of the magnetic disk drive, that a servo signal is recorded with almost constant density by changing a recording frequency in each of several zones. In this case, an applied voltage V in a servo mode may be calculated for each zone.

In the above examples, reference was made to a case where without monitoring the head flying height the open-loop control is performed. On the other hand, in a case where the feedback control is performed by monitoring the head flying height, as shown in FIG. 15, this control can be performed by obtaining current flying height from an output signal 217 of a flying height measuring sensor 215 in a flying calculating section 216, calculating an error signal with targeted flying height and adding correction to a reference voltage so as to reduce an flying error to 0. Explanation of other parts of the structure in FIG. 15 will be omitted since these are the same as in FIG. 13.

Figure 16:
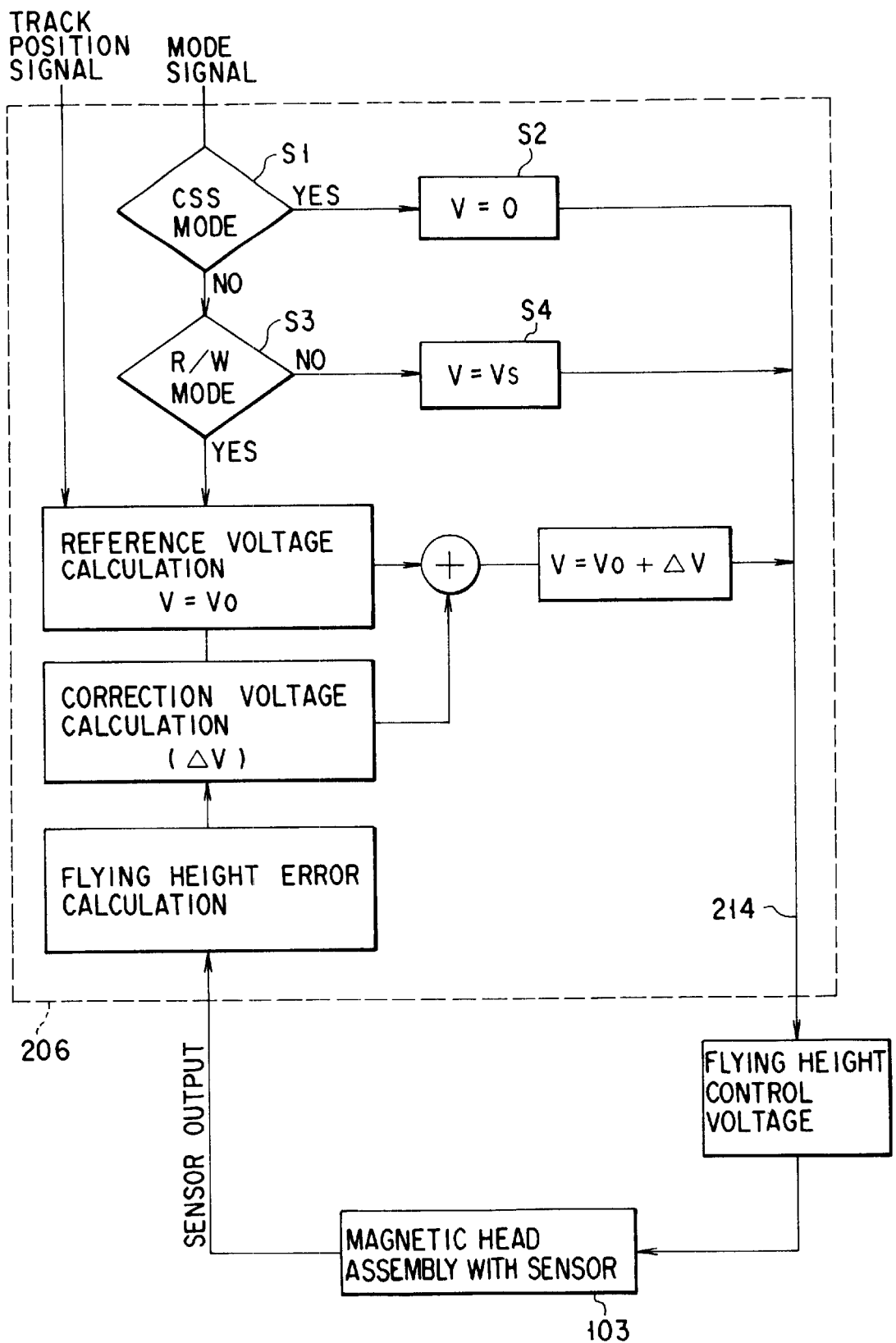
FIG. 16 is a flow chart for explaining an operation when head flying height is to be controlled by monitoring the height.

As flying height measuring means, as shown in FIG. 16, special flying height measuring means may be provided, for instance one of detecting capacity changes by a capacitance sensor. The voltage is applied between the magnetic head and the magnetic disk by adding a correction voltage to a reference voltage in the R/W mode based on the output from the flying height measuring means.

If, however, a known signal, for example, a signal of sync area etc. is reproduced by an MR head from a R/W channel and a reproducing signal is fetched into the flying height control circuit 206 and an applied voltage is controlled so as to keep this constant, it is not necessary to provide such special flying height measuring means and the drive can be simplified and costs can be reduced.

Furthermore, besides those referred to in the description of the preferred embodiments, there are other various modes available, for instance an idling mode and a sleep mode, which are made for the object of conserving power used by computers. Settings of applied voltages according to these modes and other conditions are all within the framework of the present invention.

Figure 17:
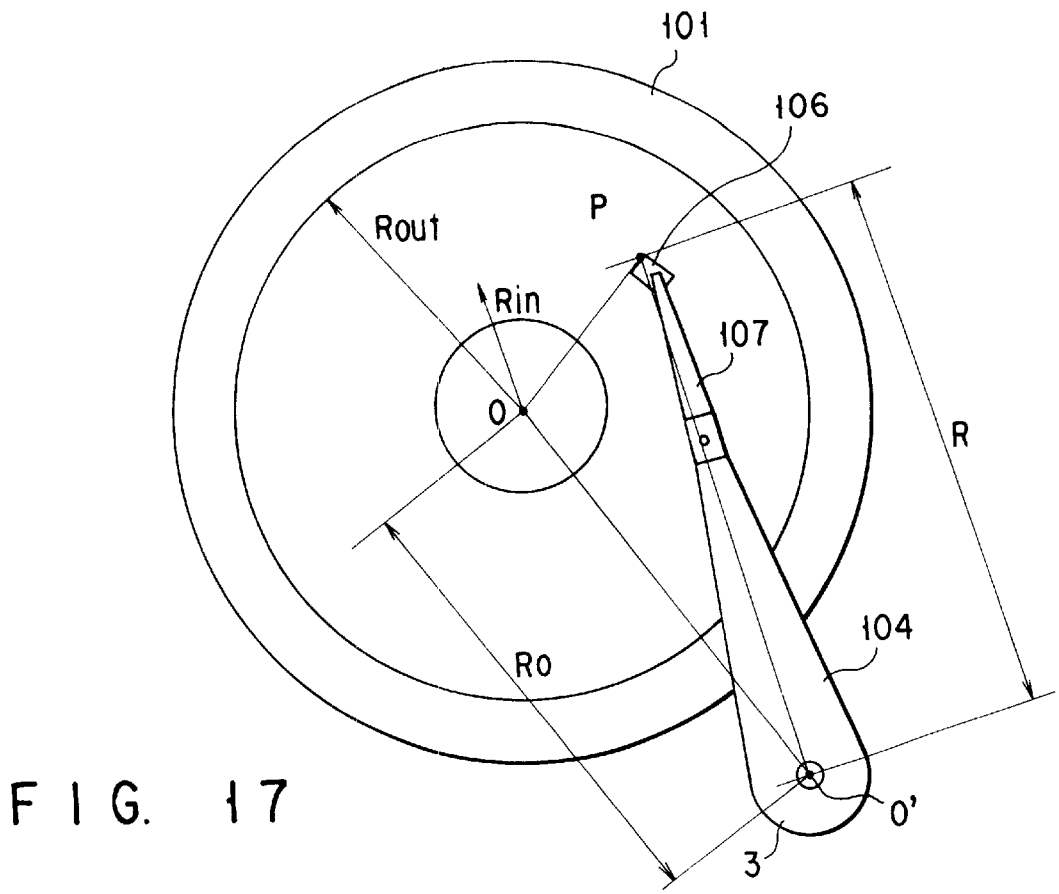
FIG. 17 is a view for explaining the conventional technique relating a optimal arm length.

In a case where the magnetic disk drive of a rotary actuator system is constructed by using a composite type thin film magnetic head constructed by laminating an inductive type thin film magnetic head as a recording head and an MR head as a reproducing head, by rotating the arm of the rotary actuator, a skew angle varies. A track misregistration between the recording track position and the reproducing head position on the magnetic disk is occurred by the skew angle $\theta$. An track misregistration Z between the writing and reading elements, a distance D of the magnetic gap between both elements, and a skew angle $\theta$ have a relationship represented by a formula, $Z=D \cdot \sin \theta$. From the Japanese Patent Application KOKAI 5-298615 (seeing FIG. 17), a relationship between a arm length of the rotary actuator (R: distance between the rotation center of the rotary actuator and center of recording/reproducing (R/W) composite head) and distance ($R_0$) from the rotation center of the disk to the rotation center of the rotary actuator is set to a optimal value in the range $1.1R_0 \leq R \leq 1.2R_0$ to reduce the variation of the skew angle. Accordingly, a track density can be improved by reducing the track misregistration of the R/W track.

Since this method is characterized in that an arm tilt angle is substantially constant from the innermost to outermost circumferences, it has problem that a conventional method used for approaching a head flying height constant from the innermost to outermost circumferences, i.e., a method using the variation of the skew angle, such as (1) a method of setting a skew angle small at inner circumference and large at outer circumference to suppress the flying height variation from the innermost to outermost circumferences, and (2) a technique, so called as TPC (Transverse Pressure Contour), for preparing a space at a side of ABS surface, suppressing the flying height variation using varying the skew angle from the innermost to outermost circumferences, and properly setting width of the space to realize the substantially constant flying height, can not be employed.

Since a flying height control method of the invention can be employed in a case that the skew angle does not vary, the same head flying height can be obtained by using the rotary actuator, to which the MR composite head is mounted, having the optimal arm length combining to the present invention. With this configuration, the recording and reproducing with the same recording density at all surface of the magnetic disk can be performed, thereby it is effective to increase of the capacities of the disk drive.

A linear actuator is an actuator of which no R/W track misregistration occurs caused by the skew angle and the flying height control can be effectively performed the same as in the case of the rotary actuator having the optimal arm length by combining the invention.

(Fourth Preferred Embodiment)

In the first to the third embodiments, a voltage is applied across the magnetic disk 101 and the head slider 106 by directly and electrically connecting the output terminal of the voltage generating circuit 108 to the head slider 106. It is possible, however, to electrically connect the output terminal of the voltage generating circuit 108 to a head actuator for moving the magnetic head 103 in the radial direction of the magnetic disk 101 and to apply a voltage across the magnetic disk 101 and the head slider 106 via this head actuator.

Figure 18A:
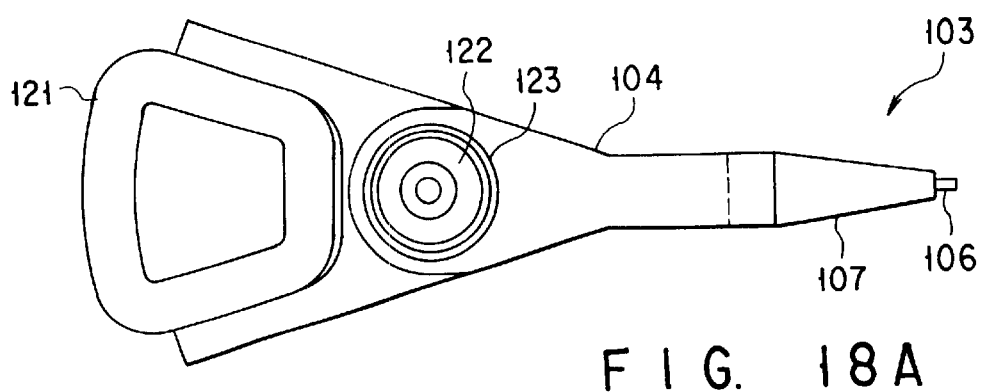
FIGS. 18A and 18B are plan and sectional views showing the structures of a magnetic head and a head actuator in the fourth embodiment of the invention.
Figure 18B:
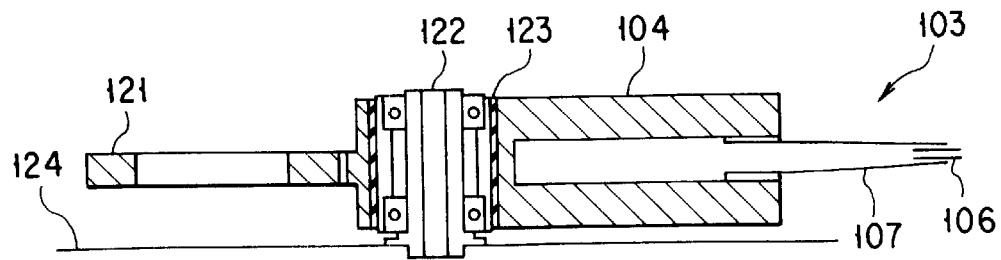

FIGS. 18A and 18B are plan and sectional views respectively showing the structures of a magnetic head 103 and a head actuator 104 in the fourth embodiment.

The head actuator 104 is a rotary type actuator constructed to move the magnetic head in the radial direction of the magnetic disk 101 by rotating with a pivot section 122 like a ball bearing as a center by means of a coil 121.

Between the main body of the head actuator 104 and the pivot section 122 an insulating spacer 123 made of a viscoelastic substance like silicone is arranged and by this insulating spacer the main body of the head actuator 104 is electrically insulated from a supporting frame 124. Also, the main body of the head actuator 104 is made of an electrically conductive material and electrically connected to the head slider 106.

The above-mentioned output terminal of the voltage generating circuit 108 is connected to the main body of the head actuator 104 electrically connected to the head slider 106. The reference voltage terminal of the voltage generating circuit 108 is, as shown in the first to the third embodiments, electrically connected to the frame 102. Therefore, according to the fourth embodiment, a voltage is applied across the magnetic disk 101 and the head slider 106 via the main body of the head actuator 104.

Figure 19:
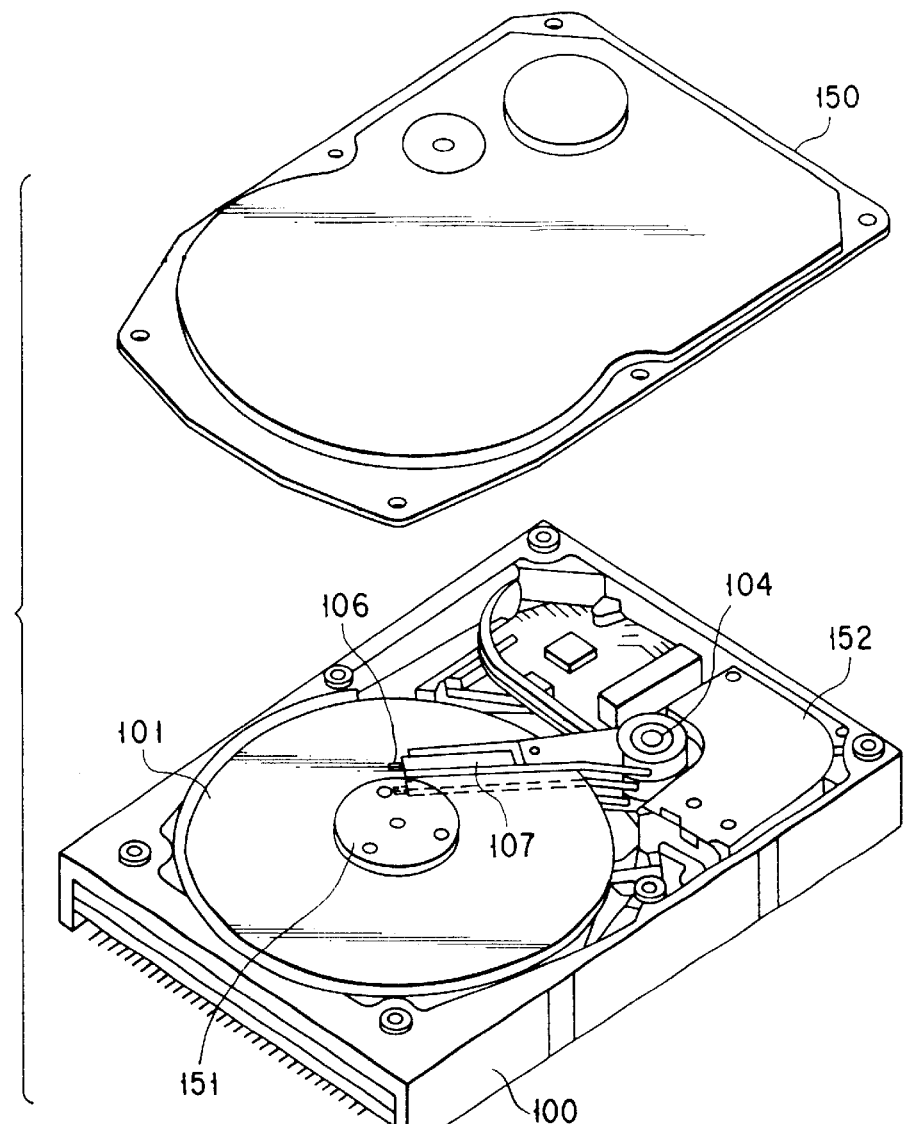
FIG. 19 is a view outlining the structure of a magnetic disk drive having a plurality of magnetic disks.

In each of the above-described embodiments, two magnetic heads are provided for one magnetic disk and a voltage is applied across the head slider of each magnetic head and the magnetic disk from a common voltage generating circuit. It is possible, however, to individually apply a voltage by providing one voltage generating circuit for each head, or to apply a voltage only across the head slider of a magnetic head selected by switching and the magnetic disk. The same is true for one in which there are a plurality of magnetic disks. A rough structure in this case is shown in FIG. 19. As the structure of the magnetic disk drive in this drawing is similar to that in FIG. 1 except the existence of a plurality of magnetic disks, explanation thereof will be omitted.

If the same voltage is to be applied across the head sliders of a plurality of magnetic heads and the magnetic disk, it is possible to prevent variations in head flying height caused by track positions and to make the head flying height uniform from the inner to the outer circumference of the magnetic disk. Since voltages are simultaneously applied across the head sliders of all the magnetic heads and the magnetic disk in accordance with the operation mode of the magnetic disk drive, it is preferable to limit variance in flying characteristics of individual magnetic heads within a specified range. Also, in this case, as referred to in the description of the fourth embodiment, if the head actuator 104 is commonly used by respective magnetic heads and the main body thereof is connected to the voltage generating circuit, it is not necessary to set a wiring to the head slider of each magnetic head and thus this is advantageous in that wiring and circuitry are greatly simplified.

Furthermore, in a case where voltages are to be individually applied across the head sliders of respective magnetic heads and the magnetic disk, setting can be made to obtain spacing suited to recording/reproducing of head flying height of only the selected magnetic head and for the other magnetic heads larger and thus safe flying height can be set.

As a result, reliability of the magnetic disk drive can be improved. Moreover, even in a case where there is variance in flying characteristics among the magnetic heads, optimal flying height control can be performed for each magnetic head and thus it is not necessary to consider such variance in flying characteristics when designing the drive. This makes it possible to perform recording/reproducing in a minimum flying space and to greatly improve recording density. Also, in this case, by electrically insulating the suspension of each magnetic head from other parts and applying a voltage, it is not necessary to set a wiring for voltage application to the vicinity of the tip of the magnetic head and thus wiring can be simplified.

Figure 20:
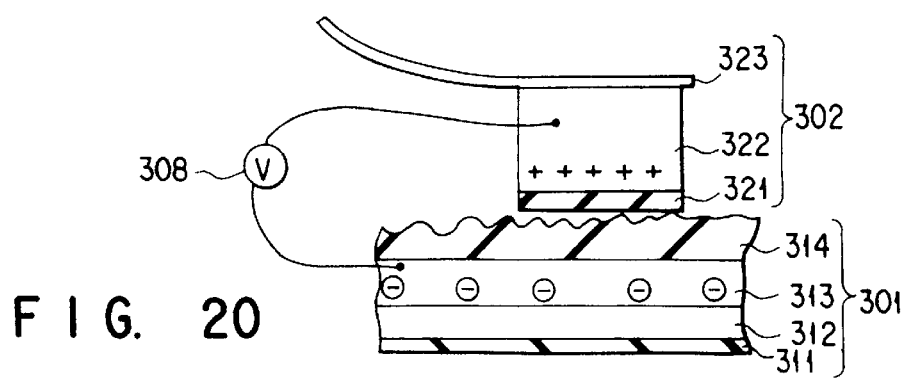
FIG. 20 is a view showing a contact type head.

FIG. 20 shows an embodiment of a contact type head. A magnetic disk is composed of insulative substrate 311 such as glass plate, an absorber layer 312, a magnetic layer 313 and insulative layer 314 composed of a dielectric material. The insulative layer is composed of $SiO_2$ or DLC, etc. A surface of the insulative material has an irregularity with, for example, a surface-roughness of several nanometer in a fine scale. The contact type head 302 has a insulative layer 321 composed of the dielectric material (such as DLC), a slider portion 322 with transducer contacting and sliding on the insulative layer of the magnetic disk 301 at the rotating speed U, and a spring portion 323 for supporting the slider and pressing the head to the disk by giving the pressing force Fn to the disk. The spring portion 323 is supported by the actuator (not shown) and moves on the disk.

A flying force is generated by the air for head and the surface-roughness of the surface of the disk even in the state of contacting the head and the disk. The electrostatic attractive force is generated by applying the appropriate voltage between the slider 322 and the magnetic layer 313 by the voltage generating circuit 308. At this time, an expression of Fa=Fe+Fn is concluded. Fe is equal to the same as that of an expression (11) and Fa is smaller than that of an expression (10). Where, Flying height is about the surface-roughness of the contact surface. A constant contact force Fc between the slider and the disk can be always obtained without depending on such as rotating speed by operating the voltage to Fe=Fa, since Fc=Fn+Fe−Fa. Fn may be set to substantially 0 and the 15 contact force may be given by almost electrostatic attractive force Fe. In this case, the contact force is enlarged by applying the voltage only in the R/W operation and the contact force is diminished by applying no voltage or lowering the applied voltage in another operation, thereby the life of the magnetic disk and the magnetic head can be elongated.

(Fifth Preferred Embodiment)

FIG. 21 is a block diagram showing the essential parts of a magnetic disk drive according to a fifth preferred embodiment. In FIG. 21, those component parts identical to the corresponding ones shown in FIG. 5 are designated by the same reference numerals, respectively, and will not be described in detail.

The magnetic disk drive according to the fifth embodiment comprises an acceleration sensor 121 for detecting the acceleration of the disturbance and a control circuit 122, in addition to the component parts of the magnetic disk drive shown in FIG. 5.

According to this embodiment, like in the first embodiment, the magnetic layer of the magnetic disk 101 is electrically connected to the rotor of the spindle motor 102, and is grounded through the spindle motor 102 and the frame 105. The suspension 107 is made of a thin metal plate and is electrically insulated from the head slider 106. The voltage generating circuit 108 applies a control voltage to the head slider 106 to impart a potential difference between the magnetic disk 101 and the magnetic head 106. The head slider 106 may be fixed to the suspension 107 by a conductive adhesive or the like, so that the head slider 106 is electrically connected to the suspension 107 and a control voltage is applied by the voltage generating circuit 108 to the suspension 107.

The magnetic heads 103 in opposed relation to each other on the sides of the magnetic disk 101 are mounted at upper and lower positions, and therefore are affected in opposite ways by disturbances as described later. Independent and different control voltages from the voltage generating circuit 108, therefore, are impressed to the magnetic heads 103.

The control circuit 122 makes up a main component element for controlling the flying height of the head slider 106 under a disturbance according to this embodiment. Specifically, the control circuit 122 is a CPU (controlling microprocessor) arranged in the magnetic disk drive. The control circuit 122 monitors the acceleration due to the disturbances from the acceleration sensor 121, i.e., the forces such as vibrations affecting the position of the head slider 106. The control voltage of the voltage generating circuit 108 thus is controlled on the basis of the detection result from the acceleration sensor 121.

According to this embodiment, the configuration including specific peripheral circuits is identical to that of the third embodiment shown in FIG. 13, and will be neither shown nor described. Also, the flying control operation is similar to the one in the second embodiment described with reference to FIGS. 8 to 12 and will be neither shown nor described.

A specific operation of the present invention will be explained.

Now, assume that a disturbance such a vibration is exerted from an external source on the magnetic disk drive. The acceleration sensor 121 detects the acceleration applied to the mechanism having the magnetic disk 101 and the head slider 106 as shown in FIG. 21, and outputs the acceleration value to the control circuit 122. The control circuit 122 monitors the detection input from the acceleration sensor 121 for any disturbance that may be generated, and upon generation of a disturbance beyond a tolerance, controls the flying height of the head slider 106.

Specifically, the control circuit 122 controls the control voltage for the head slider 106 through the voltage generating circuit 108, and regulates the electrostatic attractive force in accordance with the potential difference between the head slider 106 and the magnetic disk 101. More specifically, a disturbance normally causes the flying height of the head slider 106 to fluctuate by a predetermined amount and a force is applied to separate the magnetic head in a direction away from the magnetic disk 101. The control circuit 122 can detect the direction of the particular force on the basis of the detection result of the acceleration sensor 121, and therefore generates such an electrostatic attractive force as to pull back the head slider 106 toward the magnetic disk 101.

As described above, according to this embodiment, in the case where a disturbance acceleration is exerted on the magnetic disk drive, the position of the head slider 106 maintained with a predetermined flying height H fluctuates and is considerably separated from the magnetic disk 101. In view of this, the control circuit 122 generates an electrostatic attractive force based on the potential difference between the head slider 106 and the magnetic disk 101 thereby to restore the fluctuation of the flying height of the head slider 106 to a predetermined value. Consequently, it is possible to suppress the fluctuations of the flying height of the head slider due to a disturbance. Whenever a disturbance occurs, therefore, the write/read operation of the magnetic head 103 is prevented from becoming unstable due to the fluctuations of the flying height, thereby securing a stable write/read characteristic.

In the process, a disturbance is applied in such a manner as to reduce the space between the opposed magnetic heads 103$a$. In order to reduce the amount of this space excessively, a voltage may be always applied, and this voltage may be changed in accordance with the disturbance. This embodiment, which assumes a magnetic disk drive of air-bearing type, is applicable with equal effect also to the contact system in which the magnetic head 103 and the magnetic disk 101 are kept in contact with each other.

In the contact system, as described above, the suspension 107 applies a minimum contact force to the head slider 106. If a disturbance is applied under this contact state, the contact force changes in accordance with the acceleration of the disturbance. A large disturbance acceleration eliminates substantially the whole contact force, with the undesirable result that the head slider 106 jumps up away from the surface of the magnetic disk 101.

To prevent this inconvenience, as described above, the control circuit 122 generates an electrostatic attractive force based on the potential difference between the head slider 106 and the magnetic disk 101 and thus applies a contact force to the head slider 106. As a result, the fluctuations of the contact force of the head slider 106 due to the disturbance can be suppressed.

In the system according to the present embodiment, it is also possible to secure a proper contact force for the head slider 106 even in the case where the load by the suspension 107 is minimized. Consequently, the service life of the suspension 107, the head slider 106, the magnetic disk 101 and other component elements can be lengthened, thereby leading to a, lengthened service life of the drive as a whole.

(Sixth Preferred Embodiment)

Figure 22:
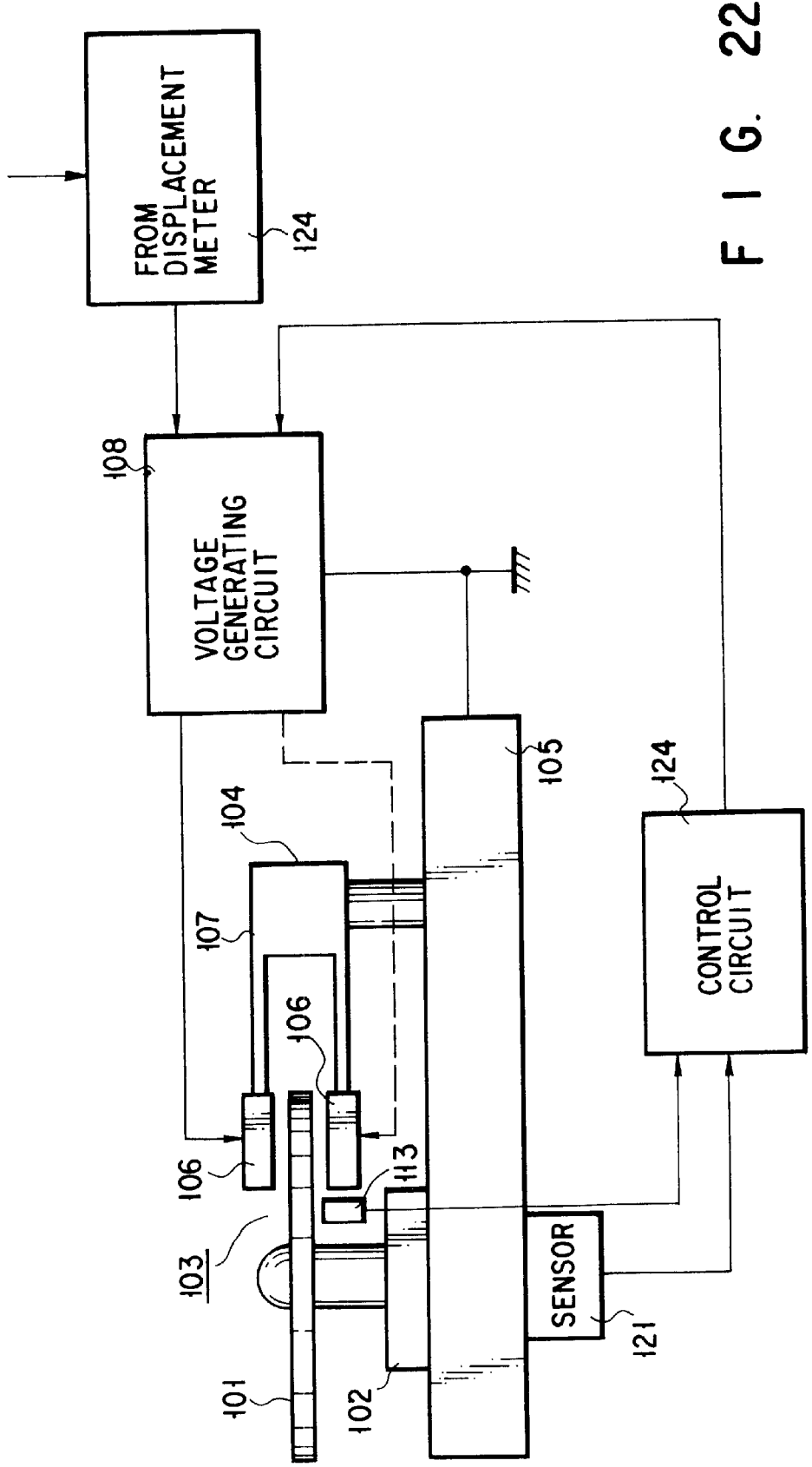
FIG. 22 is a block diagram showing the essential parts of a magnetic disk drive according to a sixth embodiment of the invention.

FIG. 22 is a block diagram showing the essential parts of a magnetic disk drive according to a sixth preferred embodiment. The drive according to the sixth embodiment, as shown in FIG. 22, comprises a displacement meter 113 for detecting the roughness of the surface of the magnetic disk 101 in addition to the disturbance acceleration sensor 121. In this magnetic disk drive, once the magnetic disk 101 is secured to the spindle motor 102, the magnetic disk surface normally develops a distortion and generates a minute roughness. The result is that an acceleration due to the roughness is applied to the magnetic head 103 traveling above the magnetic disk 101. In the contact system, therefore, the contact force of the head slider 106 thus fluctuates, while the flying height of the head slider 106 fluctuates for the air-bearing system.

The fluctuations of flying height due to the roughness, if very slight, may be ignored. In the case where the flying height of the head slider 106 is reduced to 100 nm or less with the increased recording density, however, even a slight fluctuation cannot be ignored. For the contact system, on the other hand, the fluctuations in contact force can be suppressed by increasing the initial contact force only at the sacrifice of a shorter Service life of the magnetic disk 101. The initial contact force, therefore, can be increased only by a small amount, and the fluctuations of the contact force due to the roughness cannot be ignored.

According to this embodiment, the roughness of the surface of the magnetic disk 101 is measured directly by the displacement meter 113 thereby to suppress the fluctuations of the contact force or the flying height due to the particular roughness. Specifically, the surface of the magnetic disk 101 is monitored for any roughness by the control circuit 124 supplied with the detection result from the displacement meter 113 in a manner similar to the case of disturbance detection. In response to a signal from the displacement meter 113, the control circuit 124 generates a potential difference between the head slider 106 and the Magnetic disk 101 thereby to control the flying height or the contact force of the head slider 106 at a proper value.

In the case where the displacement meter 113 is installed by Ls more upstream than the magnetic head 103, the displacement is detected earlier by Ls/U (U is the peripheral speed of the magnetic disk 101) than the actual displacement at the point of the magnetic head 103. The control circuit 124, therefore, is desirably adapted to generate a control voltage retarded in time.

According to this embodiment, a control voltage corresponding to the roughness of the magnetic disk 101 is generated from the displacement meter 113 while at the same time generating a control voltage corresponding to the detection result of the disturbance acceleration sensor 121 as in the fifth embodiment. The position of the head slider 106 and hence the position of the magnetic head 103 can thus be stabilized against both the roughness of the surface of the magnetic disk and a disturbance.

As described above, according to this embodiment, the roughness of the surface of the magnetic disk 101 (i.e, the magnetic disk displacement) is monitored so that in the case where the displacement exceeds a tolerance, the potential difference between the head slider 106 and the magnetic disk 101 is controlled in such a manner as to suppress the fluctuations of the flying height or the contact force, as the case may be. Consequently, the write/read operation of the magnetic head 103 is prevented from becoming unstable, and a stable write/read signal characteristic is secured.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnet disk drive comprising:
   a magnetic disk;
   a motor configured to rotate said magnetic disk with a predetermined rotational angle speed of ω;
   a magnetic head having a head slider arranged oppositely to said magnetic disk and a transducer supported by said head slider for performing recording/reproducing information to and from said magnetic disk;
   positioning means for moving said magnetic head between an innermost track and an outermost track to position said magnetic head;
   voltage apply means for applying a voltage between said magnetic disk and said magnetic head to adjust a flying height to 100 nm or lower by an electrostatic force during an operation; and
   an insulating layer comprising a dielectric insulator and provided on at least either one of opposed surfaces of said magnetic disk and said head slider, wherein
   an upper limit of a voltage of the applied voltage is $3 \times (\omega R)^{1/2}$ (R: outer diameter of said magnetic disk).

2. The magnetic disk drive according to claim 1, wherein said magnetic head comprises a plurality of magnetic heads and said voltage applying means applies to a voltage in accordance with the flying characteristic of each of the plurality of magnetic heads.

3. The magnetic disk drive according to claim 1, wherein said magnetic head comprises a plurality of magnetic heads and said voltage applying means applies a voltage for controlling the flying characteristic of said magnetic head between said head slider of at least one of said plurality of magnetic heads and said magnetic disk.

4. A magnetic disk drive according to claim 1, further comprising:
   detection means for detecting a disturbance as to fluctuate at least selected one of the position of the head slider and the driving force of the magnetic head with respect to the mechanisms for supporting the magnetic disk and the head slider, respectively; and
   control means for controlling the potential difference between the magnetic disk and the head slider applied by the voltage application means and setting the head slider in a predetermined position with respect to the magnetic disk on the basis of the detection result of the detection means.

5. The magnetic disk drive according to claim 1, wherein said voltage applying means applies a voltage in accordance with the voltage control signal between said magnetic disk and said magnetic head to increase, in a reading/writing mode in a specified track position, a voltage to a higher voltage than that in a seek mode in the same track.

6. The magnetic disk drive according to claim 1, wherein said applied voltage is less than 20.0 V.

7. The magnetic disk drive according to claim 1, further comprising control means for identifying an operation mode of said magnetic disk drive based on a mode signal from a hard disk controller and for sending a voltage control signal corresponding to the operation mode of said magnetic disk drive to said voltage apply means.

8. A magnetic disk drive comprising:
   a magnetic disk;
   a motor configured to rotate said magnetic disk with a predetermined rotational angle speed of ω (1/s);
   a magnetic head having a head arranged oppositely to said magnetic disk ad a transducer supported by said head slider for performing recording/reproducing information to and from said magnetic disk;
   positioning means for moving said magnetic head between an innermost track and an outermost track to position said magnetic head;
   voltage apply means for applying a voltage between said magnetic disk and said magnetic head to adjust a flying height to 100 nm or lower by an electrostatic force during an operation;
   control means for controlling said applied voltage;
   flying height detecting means for detecting the flying height of said magnetic head from said magnetic disk; and
   an insulating layer comprising a dielectric insulator and provided on at least either one of opposed surfaces of said magnetic disk and said head slider, wherein
   said control means controls said applied voltage so that a flying height detected by said flying height detecting means is kept to a predetermined flying height, and
   an upper limit of a voltage of the applied voltage is $3 \times (\omega R)^{1/2}$ (R: outer diameter of said magnet disk).

9. The magnetic disk drive according to claim 8, wherein said voltage applying means, in a reading/writing mode in a specified track position, increases the voltage to a higher voltage than that in a seek mode in the same track.

10. The magnetic disk drive according to claim 8, wherein said magnetic head comprises a plurality of magnetic heads and said voltage applying means applies a voltage in accordance with the flying characteristic of each of the plurality of magnetic heads.

11. The magnetic disk drive according to claim 8, wherein said magnetic head comprises a plurality of magnetic heads and said voltage applying means applies a voltage for controlling the flying characteristic of said magnetic head between said head slider of at least one of said plurality of magnetic heads and said magnetic disk.

12. A magnetic disk drive according to claim 8, further comprising:

detection means for detecting a disturbance as to fluctuate at least selected one of the position of the head slider and the driving force of the magnetic head with respect to the mechanisms for supporting the magnetic disk and the head slider, respectively; and control means for controlling the potential difference between the magnetic disk and the head slider applied by the voltage application means and setting the head slider in a predetermined position with respect to the magnetic disk on the basis of the detection result of the detection means.

13. The magnetic disk drive according to claim 8, wherein said applied voltage is less than 20.0 V.

* * * * *

UNITED STATES PATENT AND TRADEMARK OFFICE
CERTIFICATE OF CORRECTION

PATENT NO. : 6,359,746 B1
DATED : March 19, 2002
INVENTOR(S) : Takekado et al.

It is certified that error appears in the above-identified patent and that said Letters Patent is hereby corrected as shown below:

Title page,
Item [45], Date of patent should read:
-- [45]  Date of Patent:        *Mar. 19, 2002 --

Item [75], the Inventors' should read:
-- [75]  Inventors:   Shigeru Takekado, Tokyo; Tetsuo Inoue, Ichikawa, both of (JP) --

Item [*], the Notice should read:
-- [*]  Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

Item [30], the Foreign Application Priority Data should read:
-- [30]         Foreign Application Priority Data
Sep. 14, 1994   (JP) ................................. 6-219953
Jul. 11, 1995   (JP) ................................. 7-174805
Mar. 19, 1996   (JP) ................................. 8-063260 --

Signed and Sealed this

Seventeenth Day of September, 2002

Attest:

JAMES E. ROGAN
*Attesting Officer*          *Director of the United States Patent and Trademark Office*